United States Patent
Marsh et al.

(10) Patent No.: US 9,706,160 B2
(45) Date of Patent: *Jul. 11, 2017

(54) APPARATUS AND METHOD FOR CONFLICT RESOLUTION IN REMOTE CONTROL OF DIGITAL VIDEO RECORDERS AND THE LIKE

(75) Inventors: Christopher Marsh, Reston, VA (US); Jay Thomas, Denver, CO (US); William Webb, Winchester, VA (US); David Bell, Broomfield, CO (US); PhuDuc Nguyen, Denver, CO (US)

(73) Assignee: TIME WARNER CABLE ENTERPRISES LLC, New York, NY (US)

( * ) Notice: Subject to any disclaimer, the term of this patent is extended or adjusted under 35 U.S.C. 154(b) by 1703 days.

This patent is subject to a terminal disclaimer.

(21) Appl. No.: 12/039,795

(22) Filed: Feb. 29, 2008

(65) Prior Publication Data

US 2009/0220216 A1    Sep. 3, 2009

(51) Int. Cl.
| | |
|---|---|
| *H04N 5/782* | (2006.01) |
| *H04L 12/64* | (2006.01) |
| *H04N 21/4227* | (2011.01) |
| *H04N 21/458* | (2011.01) |
| *H04N 21/472* | (2011.01) |
| *G11B 27/031* | (2006.01) |
| *H04L 29/06* | (2006.01) |

(52) U.S. Cl.
CPC ......... *H04N 5/782* (2013.01); *H04L 12/6418* (2013.01); *H04N 21/4227* (2013.01); *H04N 21/4583* (2013.01); *H04N 21/47214* (2013.01); *H04L 65/4084* (2013.01)

(58) Field of Classification Search
CPC .............. H04N 5/76; H04N 21/4104; H04N 21/42204; H04N 21/4227; H04N 21/43615; H04N 5/765; H04N 5/781; H04N 9/8042; G11B 27/034; G11B 27/105; G11B 27/11
USPC .................... 386/291–299; 725/142
See application file for complete search history.

(56) References Cited

U.S. PATENT DOCUMENTS

| | | | |
|---|---|---|---|
| 6,311,011 B1 * | 10/2001 | Kuroda ......................... | 386/297 |
| 6,507,950 B1 * | 1/2003 | Tsukidate et al. .............. | 725/54 |
| 7,003,791 B2 * | 2/2006 | Mizutani ........................ | 725/21 |
| 7,073,189 B2 | 7/2006 | McElhatten et al. | |

(Continued)

OTHER PUBLICATIONS

U.S. Appl. No. 11/843,049, filed Aug. 22, 2007 titled "Apparatus and Method for Remote Control of Digital Video Recorders and the Like."

(Continued)

*Primary Examiner* — Gelek W Topgyal
(74) *Attorney, Agent, or Firm* — Otterstedt, Ellenbogen & Kammer, LLP

(57) ABSTRACT

At least one server is queried to obtain program data. DVR data is obtained from a digital video recorder, substantially in real time, over a content-based network. The program data and/or the DVR data are displayed on a separate remote device, in communication with the content-based network. A request to record a given program on the at least one digital video recorder is received at the separate remote device. A conflict associated with the request to record the given program is detected, and the conflict is resolved based at least on a user input received at the separate remote device.

1 Claim, 18 Drawing Sheets

(56) References Cited

U.S. PATENT DOCUMENTS

| | | | |
|---|---|---|---|
| 7,123,813 B2 * | 10/2006 | Inoue | 386/248 |
| 7,143,429 B2 * | 11/2006 | Mineyama | 725/58 |
| 7,281,261 B2 * | 10/2007 | Jaff et al. | 725/132 |
| 7,433,582 B2 * | 10/2008 | Boston et al. | 386/248 |
| 7,526,785 B1 * | 4/2009 | Pearson et al. | 725/31 |
| 7,647,388 B2 * | 1/2010 | Kato | 709/219 |
| 7,650,621 B2 * | 1/2010 | Thomas et al. | 725/87 |
| 7,689,995 B1 * | 3/2010 | Francis et al. | 718/104 |
| 7,865,924 B2 * | 1/2011 | Teegan et al. | 725/62 |
| 7,913,278 B2 * | 3/2011 | Ellis et al. | 725/37 |
| 2001/0026386 A1 | 10/2001 | Yamamoto et al. | |
| 2002/0046407 A1 | 4/2002 | Franco | |
| 2002/0154888 A1 | 10/2002 | Allen et al. | |
| 2002/0164155 A1 * | 11/2002 | Mate | 386/96 |
| 2002/0184635 A1 | 12/2002 | Istvan | |
| 2003/0005446 A1 * | 1/2003 | Jaff et al. | 725/51 |
| 2003/0056217 A1 | 3/2003 | Brooks | |
| 2003/0072559 A1 | 4/2003 | Van Haver | |
| 2003/0108331 A1 * | 6/2003 | Plourde et al. | 386/83 |
| 2003/0194200 A1 | 10/2003 | Yuen | |
| 2003/0231859 A1 * | 12/2003 | Son | 386/46 |
| 2004/0001081 A1 | 1/2004 | Marsh | |
| 2004/0103434 A1 * | 5/2004 | Ellis | 725/58 |
| 2004/0155791 A1 | 8/2004 | Nguyen et al. | |
| 2004/0218905 A1 * | 11/2004 | Green et al. | 386/83 |
| 2005/0028208 A1 * | 2/2005 | Ellis et al. | 725/58 |
| 2005/0028218 A1 | 2/2005 | Blake | |
| 2005/0031096 A1 | 2/2005 | Postrel | |
| 2005/0034171 A1 | 2/2005 | Benya | |
| 2006/0062544 A1 * | 3/2006 | Southwood et al. | 386/46 |
| 2006/0127038 A1 | 6/2006 | Kwon | |
| 2006/0136966 A1 * | 6/2006 | Folk, II | 725/58 |
| 2006/0277272 A1 * | 12/2006 | Cantalini | 709/217 |
| 2007/0039033 A1 | 2/2007 | Ota | |
| 2007/0050818 A1 | 3/2007 | Berger et al. | |
| 2007/0053653 A1 | 3/2007 | Huntington | |
| 2007/0204299 A1 * | 8/2007 | Vosseller | 725/46 |
| 2008/0010518 A1 * | 1/2008 | Jiang et al. | 714/21 |
| 2008/0127257 A1 | 5/2008 | Kvache | |
| 2008/0196056 A1 | 8/2008 | Bassett et al. | |
| 2008/0235731 A1 * | 9/2008 | Bryant et al. | 725/44 |
| 2008/0273856 A1 * | 11/2008 | Bumgardner et al. | 386/64 |
| 2009/0019485 A1 * | 1/2009 | Ellis et al. | 725/40 |
| 2009/0070817 A1 * | 3/2009 | Ellis et al. | 725/46 |
| 2009/0199230 A1 | 8/2009 | Kumar et al. | |
| 2012/0163776 A1 * | 6/2012 | Hassell et al. | 386/297 |

OTHER PUBLICATIONS

U.S. Appl. No. 11/843,036, filed Aug. 22, 2007 titled "Apparatus and Method for Remote Wireless Control of Digital Video Recorders and the Like."

* cited by examiner

300

FIG. 13
UNIFIED MESSAGING HEADER FOR A REQUEST

| HEADER | BYTES MAX | COMMENT |
|---|---|---|
| PROTOCOL HEADER TYPE | 1 | 0x20 - THE REQUEST ID FOR A UMP HEADER |
| ADDRESS TYPE | 1 | THE BROADCAST FILTER TYPE:<br>0x01 - MAC<br>0x02 - HUB<br>0x03 - QPSK<br>0x04 - ENTITLEMENT<br>*0x05 - STB TYPE [TBD]* |
| ADDRESS | 6 | MAC, HUB, QPSK, EID, etc. |
| FLAGS | 1 | 0x01 - ACKNOWLEDGE MESSAGE<br>0x02 - RESERVED<br>0x04 - RESERVED<br>0x10 - RESERVED<br>0x20 - RESERVED<br>0x40 - RESERVED<br>0x80 - RESERVED |
| MESSAGE TRANSACTION ID | 2 | UNIQUE TRANSACTION ID. |
| MESSAGE DOMAIN ID | 1 | MESSAGE DOMAIN:<br>0x00 - RDVR APPLICATION DOMAIN |
| MESSAGE TYPE | 1 | MESSAGE TYPE - THESE ARE CONSTANTS SPECIFIC TO THE ABOVE APPLICATION DOMAIN. |
| MESSAGE LENGTH | 2 | LENGTH OF THE MESSAGE |
| MESSAGE BODY | N | MESSAGE DATA |

FIG. 14
UNIFIED MESSAGING HEADER FOR A RESPONSE

| HEADER | BYTES MAX | COMMENT |
|---|---|---|
| PROTOCOL HEADER TYPE | 1 | 0x21 – THE RESPONSE ID FOR A UMP HEADER |
| ADDRESS TYPE | 1 | THE BROADCAST FILTER TYPE:<br>0x01 – MAC<br>0x02 – HUB<br>0x03 – QPSK<br>0x04 – ENTITLEMENT<br>0x05 – STB TYPE [TBD] |
| ADDRESS | 6 | MAC, HUB, QPSK, EID, etc. |
| FLAGS | 1 | 0x01 – ACKNOWLEDGE MESSAGE<br>0x02 – RESERVED<br>0x04 – RESERVED<br>0x10 – RESERVED<br>0x20 – RESERVED<br>0x40 – RESERVED<br>0x80 – RESERVED |
| MESSAGE TRANSACTION ID | 2 | THIS RESPONSE ID MUST MATCH THE REQUEST MESSAGE TRANSACTION ID. |
| MESSAGE DOMAIN ID | 1 | MESSAGE DOMAIN:<br>0x00 – RDVR APPLICATION DOMAIN |
| MESSAGE TYPE | 1 | MESSAGE TYPE – THESE ARE CONSTANTS SPECIFIC TO THE ABOVE APPLICATION DOMAIN. |
| MESSAGE LENGTH | 2 | LENGTH OF THE MESSAGE |
| MESSAGE BODY | N | MESSAGE DATA |

FIG. 15
UNIFIED MESSAGING HEADER FOR A REQUEST – SPECIFIC TO DVR

| HEADER | BYTES MAX | COMMENT |
|---|---|---|
| PROTOCOL HEADER TYPE | 1 | 0x20 – THE REQUEST ID FOR A UMP HEADER |
| ADDRESS TYPE | 1 | THE BROADCAST FILTER TYPE:<br>0x01 – MAC<br>0x02 – HUB<br>0x03 – QPSK<br>0x04 – ENTITLEMENT<br>0x05 – STB TYPE [TBD] |
| ADDRESS | 6 | MAC, HUB, QPSK, EID, etc. |
| FLAGS | 1 | 0x01 – ACKNOWLEDGE MESSAGE<br>0x02 – RESERVED<br>0x04 – RESERVED<br>0x10 – RESERVED<br>0x20 – RESERVED<br>0x40 – RESERVED<br>0x80 – RESERVED |
| MESSAGE TRANSACTION ID | 2 | UNIQUE TRANSACTION ID. |
| MESSAGE DOMAIN ID | 1 | MESSAGE DOMAIN:<br>0x02 – RDVR APPLICATION DOMAIN |
| MESSAGE TYPE | 1 | 0x00 – SCHEDULE DVR RECORDING<br>0x01 – UN-SCHEDULE DVR RECORDING<br>0x02 – SHOW LIST |
| MESSAGE LENGTH | 2 | LENGTH OF THE MESSAGE |
| MESSAGE BODY | N | MESSAGE DATA |

FIG. 16
EVENT ATTRIBUTES

| HEADER | BYTES | MAX | COMMENT |
|---|---|---|---|
| SERVICE ID | 2 | | THE SERVICE ID TO RECORD THE EVENT |
| EVENT | 5 | | THIS 5-BYTE FIELD IS A CONCATENATION OF THE CATEGORY AND THE EVENT ID. THE HIGH-BYTE CONTAINS THE CATEGORY. THE NEXT 4 BYTES CONTAIN THE EVENT ID. |
| EVENT EPISODE | 2 | | 2-BYTE, UNSIGNED INTEGER OF THE EPISODE OF THE PROGRAM. |
| AirTime | 4 | | START TIME OF THE RECORDING, IN SECONDS SINCE JAN 1, 1970 UTC. |
| EVENT TYPE | 1 | | 0x00 = SINGLE<br>0x01 = SERIES |

FIG. 17
RECORDING ATTRIBUTES

| HEADER | BYTES | MAX | COMMENT |
|---|---|---|---|
| Rec_NumEpisodes | 1 | | NUMBER OF EPISODES TO KEEP. ONLY VALID FOR SERIES RECORDING<br>0x01 = 1 EPISODE<br>0x03 = 3 EPISODES<br>0x05 = 5 EPISODES<br>0x07 = 7 EPISODES<br>0xFF = ALL EPISODES |
| Rec_SaveOptions | 1 | | 0x00 = SAVE UNTIL USER DELETES<br>0x01 = SAVE UNTIL SPACE IS NEEDED |
| Rec_RepeatOptions | 1 | | ONLY VALID FOR SERIES RECORDINGS<br>0x00 = ONLY NEW EPISODES AND SELECTED AIR TIME<br>0x01 = ALL EPISODES AND SELECTED AIR TIME<br>0x02 = ONLY NEW EPISODES AND ALL AIRINGS<br>0x03 = ALL EPISODES AND ALL AIRINGS<br><br>1st BIT = ONLY NEW EPISODES = 0/ALL EPISODES = 1<br>2nd BIT = SELECTED AIR TIME = 0/ALL AIRINGS = 1 |
| Rec_StartTimeAdjustment | 2 | | SIGNED VALUE IN MINUTES |
| Rec_EndTimeAdjustment | 2 | | SIGNED VALUE IN MINUTES |
| Rec_Priority | 2 | | 0x0000 = RESERVED<br>0xFFFF = MAX PRIORITY: RECORD EVEN IF CONFLICT EXISTS<br>0x0001 = MIN PRIORITY: DO NOT RECORD IF CONFLICT EXISTS |

FIG. 18A
RESULT ATTRIBUTES

| HEADER | BYTES | MAX | COMMENT |
|---|---|---|---|
| Res_Code | 1 | | RESULT CODE:<br>0x00 - 0x80 = SUCCESS<br>0x81 - 0xFF = FAILURE<br><br>0x81 - REASON UNKNOWN<br>THIS BECOMES THE CATCH ALL FAILURE IF THE ERROR DOES NOT FIT INTO ANY OTHER DEFINED SCENARIOS<br><br>0x88 - BAD ARGUMENT<br>IF THE DVR RECEIVES AN INVALID ARGUMENT<br><br>0x89 - COULD NOT LOCATE EVENT<br>THE DVR IS UNABLE TO FIND THE EVENT IN IT'S CATALOG DATA. THIS ONLY APPLIES TO SCHEDULING OR UPDATING AN EVENT'S PARAMETERS. *CURRENTLY IN PHASE I RDVR DOES NOT SUPPORT UPDATING AN EVENT'S PARAMETERS.*<br><br>0x8D - OBJECT NOT FOUND<br>THE DVR IS UNABLE TO FIND THE EVENT IN IT'S CATALOG DATA. THIS ONLY APPLIES TO DELETING A RECORDING. *CURRENTLY IN PHASE I RDVR DOES NOT SUPPORT REMOVING EVENTS FROM THE STB's HARD DRIVE.*<br><br>0x8E - EVENT ALREADY SCHEDULED<br>THE EVENT HAS ALREADY BEEN SCHEDULED ON THE DVR<br><br>0xA0 - NO TUNER AVAILABLE<br>NO TUNER IS AVAILABLE FOR RECORDING. THIS MAY OCCUR, IN A DUAL TUNER ENVIRONMENT, WHEN 2 EVENTS ARE ALREADY SCHEDULED FOR RECORDING DURING THAT TIME SLOT |

FIG. 18

| FIG. 18A |
|---|
| FIG. 18B |

FIG. 18B
RESULT ATTRIBUTES

| | | |
|---|---|---|
| | | 0xA2 - NOT AUTHORIZED<br>THE CUSTOMER IS NOT AUTHORIZED FOR THIS SERVICE. FOR INSTANCE, IF THE CUSTOMER TRIES TO RECORD AN EVENT ON HBO BUT THE CUSTOMER DOES NOT HAVE HBO IN THEIR SUBSCRIBER PACKAGE.<br><br>0xAB - NOT READY TO HANDLE REQUEST<br>THE RECORDING MANAGER HAS NOT BEEN INITIALIZED ON THE DVR<br><br>0xAE - DVR DISABLED<br>THE CUSTOMER'S STB IS NOT ENTITLED FOR DVR SERVICE. THIS MAY OCCUR IF THE DVR SERVICE HAS BEEN DISABLED BY THE DIVISION.<br><br>0xB2 - SERVICE NOT FOUND<br>THE DVR COULD NOT FIND THE SERVICE<br><br>0xFF - STB NOT RESPONDING<br>THIS IS RETURNED BY THE SERVER IF THE TIMEOUT LIMIT HAS BEEN EXCEEDED. THIS MAY OCCUR IF THE STB IS POWERED OFF. |
| Failure_Event_Count | 2 | THE COUNT OF EVENT ID's THAT ARE CONFLICTING |
| for (i=0; i<<br>Failure_Event_Count; i++)<br>{ | | |
| SERVICE ID | 2 | SERVICE ID THAT'S AIRING THE EVENT |
| EVENT | 4 | THIS 4-BYTE FIELD IS A CONCATENATION OF THE CATEGORY AND THE ASSETS ID. THE HIGH-BYTE CONTAINS THE CATEGORY. |
| EVENT EPISODE | 2 | 2-BYTE, UNSIGNED INTEGER OF THE EPISODE OF THE PROGRAM. |
| } | | |

FIG. 19
SCHEDULE DVR RECORDING REQUEST

| HEADER | BYTES MAX | COMMENT |
|---|---|---|
| MESSAGE HEADER | 15 | TYPE 0x20 MESSAGE HEADER. |
| EVENT ATTRIBUTES | 14 | EVENT ATTRIBUTES |
| RECORDING ATTRIBUTES | 9 | RECORDING ATTRIBUTES |

FIG. 20
SCHEDULE DVR RECORDING RESPONSE

| HEADER | BYTES MAX | COMMENT |
|---|---|---|
| MESSAGE HEADER | 15 | TYPE 0x21 MESSAGE HEADER. |
| RESULT ATTRIBUTES | N | MESSAGE DATA |

FIG. 21
UN-SCHEDULE DVR RECORDING REQUEST

| HEADER | BYTES MAX | COMMENT |
|---|---|---|
| MESSAGE HEADER | 15 | TYPE 0x20 MESSAGE HEADER. |
| EVENT ATTRIBUTES | 14 | EVENT ATTRIBUTES |

FIG. 22
UN-SCHEDULE DVR RECORDING RESPONSE

| HEADER | BYTES MAX | COMMENT |
|---|---|---|
| MESSAGE HEADER | 15 | TYPE 0x21 MESSAGE HEADER. |
| RESULT ATTRIBUTES | 3 | 3-BYTES – FAILURE EVENT COUNT SHOULD BE SET TO 0. |

FIG. 23
SHOW LIST REQUEST

| HEADER | BYTES | MAX | COMMENT |
|---|---|---|---|
| MESSAGE HEADER | 15 | | TYPE 0x20 MESSAGE HEADER |
| RECORDING STATE | 1 | | THE STATE OF THE RECORDING:<br>0x00 = SCHEDULED RECORDINGS (NOT YET AIRED OR RECORDED)<br>0x01 = RECORDING IN PROGRESS (*CURRENTLY UNSUPPORTED*)<br>0x02 = RECORDING COMPLETE (*CURRENTLY UNSUPPORTED*) |
| START TIME | 4 | | EVENTS OCCURRING AFTER THIS START TIME. UNITS ARE IN SECONDS SINCE JAN 1, 1970 UTC. |
| MAX EVENT COUNT | 1 | | THE LIMIT OF EVENTS THAT MAY BE RETURNED BY THE STB |

FIG. 24
SHOW LIST RESPONSE

| HEADER | BYTES | MAX | COMMENT |
|---|---|---|---|
| MESSAGE HEADER | 15 | | TYPE 0x21 MESSAGE HEADER |
| EVENT COUNT<br>for (i=0; i<Event Count; i++) | 1 | | THE COUNT OF EVENTS RETURNED |
| EVENT ATTRIBUTES | 13 | | |
| RECORDING ATTRIBUTES | 9 | | |

APPARATUS AND METHOD FOR CONFLICT RESOLUTION IN REMOTE CONTROL OF DIGITAL VIDEO RECORDERS AND THE LIKE

CROSS-REFERENCE TO RELATED APPLICATION(S)

The present application is related to a commonly assigned U.S. application entitled "Apparatus And Method For Remote Control Of Digital Video Recorders And The Like," Ser. No. 11/843,049 filed Aug. 22, 2007, the complete disclosure of which is expressly incorporated by reference herein in its entirety for all purposes.

FIELD OF THE INVENTION

The present invention relates generally to communications systems and methods, and, more particularly, to techniques for remote control of a digital video recorder (DVR) or the like through a communications network such as, for example, a cable television network (or other content network), a wireless network such as a cellular network, a Transmission Control Protocol/Internet Protocol (TCP/IP) network, a DOCSIS® (Data Over Cable Service Interface Specification) network (registered mark of Cable Television Laboratories, Inc., 400 Centennial Parkway Louisville Colo. 80027, USA), and the like.

BACKGROUND OF THE INVENTION

With the advent of digital communications technology, many TV program streams are transmitted in digital formats. For example, Digital Satellite System (DSS), Digital Broadcast Services (DBS), and Advanced Television Standards Committee (ATSC) program streams are digitally formatted pursuant to the well known Moving Pictures Experts Group 2 (MPEG-2) standard. The MPEG-2 standard specifies, among other things, the methodologies for video and audio data compression allowing for multiple programs, with different video and audio feeds, to be multiplexed in a transport stream traversing a single transmission channel. A digital TV receiver may be used to decode an MPEG-2 encoded transport stream, and extract the desired program therefrom.

In accordance with the MPEG-2 standard, video data may be compressed based on a sequence of groups of pictures (GOPs), made up of three types of picture frames, namely, intra-coded picture frames ("I-frames"), forward predictive frames ("P-frames"), and bilinear frames ("B-frames"). Each GOP may, for example, begin with an I-frame which is obtained by spatially compressing a complete picture using discrete cosine transformation (DCT). As a result, if a transmission error or a channel switch occurs, it is possible to resume correct decoding at the next I-frame. The GOP may represent additional frames by providing a much smaller block of digital data that indicates how small portions of the I-frame, referred to as macroblocks, move over time.

An I-frame is typically followed by multiple P- and B-frames in a GOP. Thus, for example, a P-frame occurs more frequently than an I-frame by a ratio of about 3 to 1. A P-frame is forward predictive and is encoded from the I- or P-frame that precedes it. A P-frame contains the difference between a current frame and the previous I- or P-frame. A B-frame compares both the preceding and the subsequent I- or P-frame data. The B-frame contains the average of matching macroblocks or motion vectors. Because a B-frame is encoded based upon both preceding and subsequent frame data, it effectively stores motion information.

Thus, MPEG-2 achieves its compression by assuming that only small portions of an image change over time, allowing the representation of these additional frames to be quite compact. Although GOPs have no relationship between themselves, the frames within a GOP have a specific relationship which builds off the initial I-frame.

The compressed video and audio data are typically carried by continuous elementary streams, respectively, which are broken into access units or packets, resulting in packetized elementary streams (PESs). These packets are identified by headers that contain time stamps for synchronizing, and are used to form MPEG-2 transport streams. For digital broadcasting, multiple programs and their associated PESs are multiplexed into a single transport stream. A transport stream has PES packets further subdivided into short fixed-size data packets, in which multiple programs encoded with different clocks can be carried. A transport stream not only comprises a multiplex of audio and video PESs, but also other data such as MPEG-2 program specific information (sometimes referred to as metadata) describing the transport stream. The MPEG-2 metadata may include a program associated table (PAT) that lists every program in the transport stream. Each entry in the PAT points to an individual program map table (PMT) that lists the elementary streams making up each program. Some programs are open, but some programs may be subject to conditional access (encryption), and this information (i.e., whether open or subject to conditional access) is also carried in the MPEG-2 transport stream, typically as metadata.

The aforementioned fixed-size data packets in a transport stream each carry a packet identifier (PID) code. Packets in the same elementary streams all have the same PID, so that a decoder can select the elementary stream(s) it needs and reject the remainder. Packet-continuity counters may be implemented to ensure that every packet that is needed to decode a stream is received.

The well-known H.264/MPEG-4/AVC (Advanced Video Coding) standard is noted for achieving very high data compression and employs basic principles similar to those of MPEG-2, with a number of features that are enhanced, compared to MPEG-2, as will be familiar to the skilled artisan.

Use of digital video recorders (DVRs), also known as personal video recorders (PVRs), such as the TiVo® device (registered mark of TiVo Brands LLC, Alviso, Calif.) and the R Replay TV® device (registered mark of Digital Networks North America Inc., Pine Brook, N.J.), is ubiquitous. Such devices may provide some benefits to TV viewers. For example, a prior art DVR allows a user to record his or her favorite TV programs for later review, and to exercise a season-pass-like option wherein every episode of his or her favorite program is recorded for some period. Such devices may automatically record programs for the user based on his or her viewing habits and preferences. The presentation of the recorded programming content can be manipulated by exercising rewind, pause, skip and/or fast-forward functions (hereinafter referred to as "trick mode" functions) furnished by the DVR.

U.S. Pat. No. 7,073,189 of McElhatten, et al. is entitled "Program guide and reservation system for network based digital information and entertainment storage and delivery system." The disclosure of the aforesaid U.S. Pat. No. 7,073,189 of McElhatten, et al. is expressly incorporated herein by reference for all purposes. A "network PVR (NPVR)" (also referred to as an NDVR (Network Digital. Video Recorder)) service allows the user to perform the analogous DVR functions through use of a network, rather than via a local DVR at the user premises. Unlike a DVR device, the NPVR service allows a user to "reserve" past and future programs for his or her review, even if such reserved programs were not identified by the user before their broadcast.

Note that "trick modes" or "trick play" refer to one or more of fast forward, reverse, pause, skip, and the like. Note also that an NDVR can be distinguished from a DVR in that the latter, storage of programs and the like is local to the DVR, while in the former (NDVR) case, such storage is at the server or head end level.

US Patent Application Publication 20060062544 of Southwood et al. discloses an apparatus and method for programming a video recording device using a remote computing device. In particular, a recorder device, such as a VCR, digital video recorder, or the like, that can be programmed from a remote computing device, such as a personal computer mobile personal digital assistant, or cell phone, over a wired and/or wireless network is disclosed. The recording device includes a recording medium configured to record audio and/or video content. A controller, which is coupled to the recording medium, is configured to control the writing of audio and/or video content onto the recording medium and to control the reading of audio and/or video content stored on the recording medium. The recording apparatus also includes a network interface configured to receive recording commands generated by a remote computer and transmitted via a network coupled to the network interface and to provide the received recording commands to the controller, the recording commands defining a selected programming content to be recorded on the recording medium.

SUMMARY OF THE INVENTION

Principles of the present invention provide techniques for conflict resolution in remote control of digital video recorders and the like. In one aspect, an exemplary method (which can be computer implemented) for resolving conflicts in connection with controlling at least one digital video recorder interconnected with a content-based network includes the step of querying at least one server to obtain program data from the server and DVR data from the digital video recorder. Also included is the step of receiving the program data from the server and the DVR data from the digital video recorder. The DVR data is obtained from the digital video recorder substantially in real time over the content-based network. Additional steps include displaying the program data and/or the DVR data on a separate device, in communication with the content-based network; receiving, at the separate device, a request to record a given program on the at least one digital video recorder; detecting a conflict associated with the request to record the given program; and resolving the conflict based at least on a user input received at the separate device.

In another aspect, a system for resolving conflicts in connection with controlling at least one digital video recorder with another device includes a content-based network coupled to the at least one digital video recorder; and a DVR control application module coupled to the content-based network and the device. The module is configured to obtain program data and to obtain DVR data from the digital video recorder. The DVR data is obtained from the digital video recorder substantially in real time over the content-based network. The module is also configured to facilitate display of the program data and/or the DVR data on the device; receive, from the device, a request to record a given program on the digital video recorder; detect a conflict associated with the request to record the given program; and resolve the conflict based at least on a user input received from the device.

In yet another aspect, a method for a content service provider to offer a consumer a service of resolving conflicts in connection with controlling at least one digital video recorder operated by the content service provider includes the steps of facilitating querying at least one server from a device of the consumer to obtain program data from the server and DVR data from the digital video recorder. The at least one server is under control of the content service provider. An additional step includes transmitting, by the content service provider, the program data from the server and the DVR data from the digital video recorder in a format for display of the program data and/or the DVR data on the device. The DVR data is obtained from the digital video recorder substantially in real time over the content-based network. Further steps include receiving, by the content service provider, from the separate device, a request to record a given program on the at least one digital video recorder; detecting, by the service provider, a conflict associated with the request to record the given program; and resolving the conflict, by the service provider, based at least on a user input received from the separate device.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed.

An exemplary embodiment of an apparatus, according to yet another aspect of the invention, can include a memory and at least one processor coupled to the memory. The processor can be operative to facilitate performance of one or more of the method steps described herein. In still another aspect, an apparatus or system can comprise means for performing the various method steps. The means can include one or more hardware modules, one or more software modules, or a mixture of one or more software modules and one or more hardware modules.

One or more method steps of the present invention can be implemented in the form of an article of manufacture comprising a machine readable medium that contains one or more programs which when executed implement such step(s).

Techniques of the present invention can provide substantial beneficial technical effects. For example, one or more inventive embodiments provide direct access to a DVR allowing more accurate determination of programs currently recorded and/or scheduled for recording, as compared to accessing a persisted copy instead of the DVR per se. Thus, accurate conflict resolution is possible.

These and other features and advantages of the present invention will become apparent from the following detailed description of illustrative embodiments thereof, which is to be read in connection with the accompanying drawings.

BRIEF DESCRIPTION OF THE DRAWINGS

FIGS. 13-24 depict aspects of an exemplary unified messaging protocol, useful in connection with one or more aspects of the invention.

DETAILED DESCRIPTION OF PREFERRED EMBODIMENTS

One or more inventive embodiments may be implemented, by way of example, and not limitation, within the context of delivering programming content to users through a broadband communications network, such as a cable TV network. Users may have DVR capability in their homes, either within a set-top box (STB) or as a stand-alone component. In some cable TV networks, selected programs or program channels may be afforded a network personal video recorder (NPVR) service to enhance a user's enjoyment of programming content. One or more embodiments of the invention relate to remote control of a DVR; however, for purposes of generality, we discuss networks that may have NPVR functionality, inasmuch as one or more embodiments of the invention may be implemented within networks not having NPVR functionality, as well as within networks that also have such NPVR functionality. In accordance with the NPVR service, broadcast programs (or at least those broadcast programs afforded the NPVR service) are recorded at a head-end of a cable network when they are delivered to a user at a set-top terminal. Thus, the user not only may "reserve" for review a future program and a previously broadcast program, but may also restart an in-progress program, since such program has been recorded at the head-end regardless of any user request. That is, the NPVR service obviates the need for the proactive effort otherwise required of a typical DVR user, which includes deciding and actively electing in advance what shows to record. In addition, the NPVR service furnishes trick mode functions for manipulating a presentation of recorded programming content. In one or more embodiments of the invention, users are enabled to remotely control DVRs from personal computers, remote wireless devices, and the like. Such capability is advantageous where NPVR capability is not available, or as a supplement to NPVR capability. Thus, as noted just above, remote DVR control aspects of the invention can be implemented in systems with or without NPVR services. US Patent Application Publication 2005-0034171, kind code A1, of Robert Benya, published Feb. 10, 2005, entitled "Technique for delivering programming content based on a modified network personal video recorder service," is expressly incorporated herein by reference for all purposes, and discloses a non-limiting example of a network that can be modified to implement one or more inventive techniques.

An exemplary service, within which one or more aspects of the invention may be employed, will now be described. It should be understood that the described service is exemplary and not meant to be limiting, as one or more embodiments of the invention may be employed with other services, differing from that described.

Figure 1:
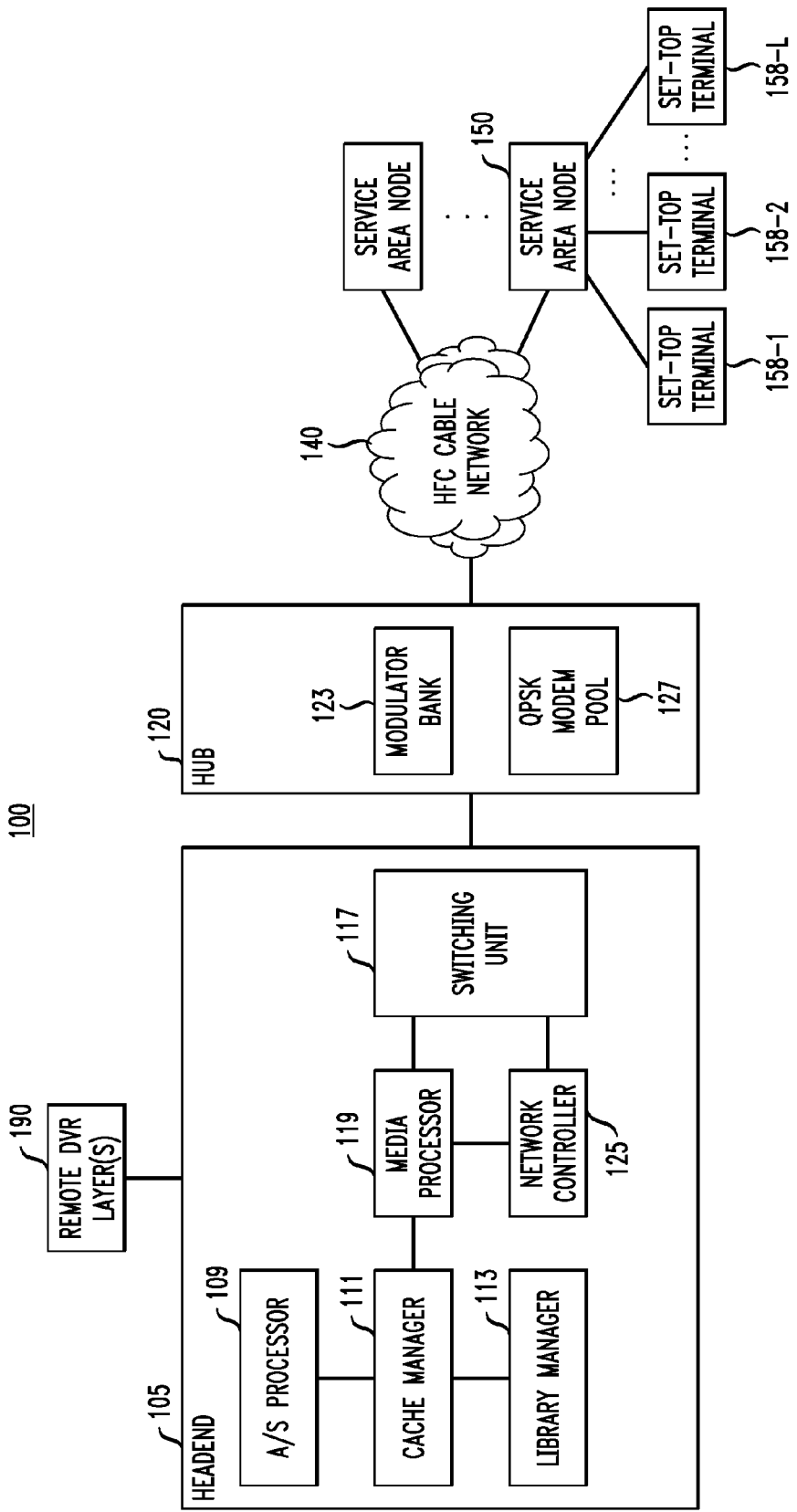
FIG. 1 is a block diagram of a broadband communications system in accordance with the invention.

FIG. 1 illustrates broadband communications system 100 for providing the inventive service. For example, system 100 in this instance includes a cable system for delivering information and entertainment programs to set-top terminals (also known as set-top boxes) on the user premises. As shown in FIG. 1, system 100 includes head-end 105, hub 120, hybrid fiber coax (coaxial) (HFC) cable network 140 and different service area nodes including node 150, which in this instance is connected to set-top terminals 158-1 through 158-L in a neighborhood, where L is an integer. For convenience, future reference to one or more terminals may refer simply to element 158. Furthermore, it should be noted that in one or more exemplary embodiments depicted herein, terminals 158 include DVR functionality, it being understood that such functionality may be obtained via a separate DVR and set-top terminal or by a single integrated device.

Head-end 105 receives programs and services from various providers and sources, e.g., analog and digital satellite sources, application servers, media servers, the Internet, and the like. Analog and digital satellite sources typically provide the traditional forms of television broadcast programs and information services. Application servers typically provide executable code and data for application specific services such as database services, network management services, transactional electronic commerce services, system administration console services, other application specific services (such as stock ticker, sports ticker, weather and interactive program guide data), resource management services, connection management services, subscriber care services, billing services, operation system services, and object management services. Media servers provide time-critical media assets such as MPEG-2 encoded video and audio, MPEG-2 encoded still images, bit-mapped graphic images, Pulse Code Modulation (PCM) digital audio, three dimensional graphic objects, application programs, application data files, etc. Although specific examples of programs and services which may be provided by the aforementioned sources are given herein, other programs and services may also be provided by these or other sources.

Acquisition/Staging (A/S) processor 109 in head-end 105 processes program materials including, e.g., TV program streams, from one or more of the aforementioned sources in analog and digital forms. Analog TV program streams may be formatted according to the National Television Standards Committee (NTSC) or Phase Alternating Line (PAL) broadcast standard. Digital TV streams may be formatted according to the Digital Video Broadcasting (DVB), Society of Cable Telecommunications Engineers (SCTE), or Advanced Television Systems Committee (ATSC) standards. Processor 109, among other things, extracts program content in the analog and digital TV streams and reformats the content to form one or more MPEG-2 encoded transport streams. Such reformatting may even be applied to those received streams already in an MPEG-2 format. This stems from the fact that the digital content in the received MPEG-2 streams is typically encoded at a variable bit rate (VBR). To avoid data "burstiness," processor 109 in a conventional manner re-encodes such digital content at a constant bit rate (CBR) to form the aforementioned transport streams. Head-end 105 communicates with one or more remote DVR layers 190 for providing remote control of one or more DVRs (for example, integral with or associated with set-top terminals 158-1 to L). Exemplary functionality of layers 190 is described hereinafter with respect to FIGS. 7-9.

An MPEG-2 transport stream contains multiple program streams with different video and audio feeds multiplexed for transmission through the same transmission channel. The program streams representing individual programs are identified by respective program identifications (IDs) within a transport stream. It should be noted at this point that the term "transmission channel" should not be confused with a "program channel." A "transmission channel" signifies a designated frequency band through which a transport stream is transmitted. On the other hand, a "program channel" signifies the source of the program material selected by a user to view. For example, a user may select program channel 2 to view program material provided by CBS, program channel 23 to view program material provided by Home Box Office (HBO); program channel 32 to view program material provided by Music Television (MTV), and so on. At this juncture, it should be noted that compression techniques other than MPEG-2 may be employed.

In this illustrative embodiment, the transmission channels, each carrying a transport stream, may be 6 MHz bands populating a forward passband, e.g., a 350-750 MHz band, of a coaxial cable, which is allocated for downstream communication from head-end 105 to a given set-top terminal 158.

A/S processor 109 may receive "assets" including pre-staged movie videos, news reports, sports events, etc. from content providers. However, processor 109 may also create "assets" in real time while processing received program materials which are not pre-staged by the content providers. In general, an "asset" is a container and/or reference for any object or set of objects that may be desired in order to implement a service, including video, audio, images, application executables, scripts, configuration files, text, fonts, and hypertext mark-up language (HTML) pages (or pointers referencing their storage locations). In addition to the raw content, metadata is also a part of an asset object that describes characteristics of the asset. For example, asset metadata may describe attributes that are inherent in the content of the asset, such as the rating, format, duration, size, or encoding method. Values for asset metadata are typically determined at the time the asset is created, but can also be determined before such time and then populated into appropriate locations when the asset is created.

Figure 2:
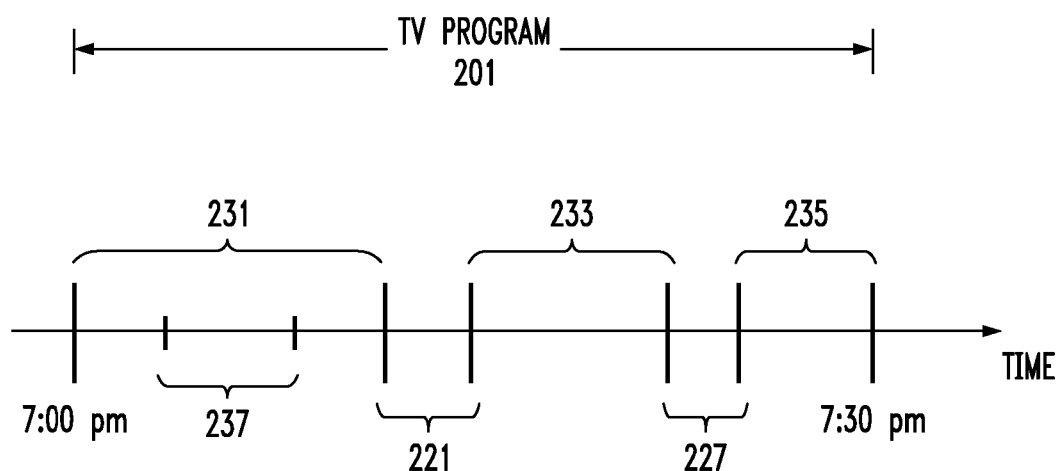
FIG. 2 illustrates a TV program comprising multiple program segments which is provided in the system of FIG. 1.

An asset concerning a program may, in some instances, include trick files associated with the program as well. Trick modes and trick files are discussed herein for purposes of providing a detailed description of one particular type of network that can be employed in one or more embodiments of the invention. It is to be emphasized, however, that this is purely by way of example, and inventive techniques can also be implemented in other networks that omit some or all of the described functionality. Still with reference to FIG. 1, and with reference also now to FIG. 2, TV program 201 spans from 7:00 p.m. to 7:30 p.m. Program 201 comprises a show interrupted by commercials, which is typical. Thus, the program content in this instance consists of show segments 231, 233 and 235, interleaved with commercial segments 221 and 227. The TV program streams received by processor 109 are pre-processed, e.g., by the providers, to include sensible flags (indicators), such as, for example, cue-tones, on which processor 109 relies to identify the demarcations (or edges) of different programs and program segments within each program. Thus, in this instance, before processor 109 processes the TV program stream containing TV program 201, a first cue-tone has been inserted at the beginning of segment 231, indicating the beginning of TV program 201; second cue-tones have been inserted at the beginnings of segments 221 and 227, indicating the beginnings of the respective commercial segments; third cue-tones have been inserted at the ends of segments 221 and 227, indicating the ends of the respective commercial segments; and a fourth cue-tone has been inserted at the end of segment 235, indicating the end of TV program 201. Another set of cue-tones may be inserted to delimit a "chapter" (denoted 237) within a program. A chapter is a self-contained subprogram, e.g., a skit, monolog, song performance, news report, weather report, etc. within a program. With the cue-tones defining one such chapter, processor 109 is capable of identifying the chapter and creating an asset concerning the same.

For illustrative purposes, assume that TV program 201 in this instance is an initial broadcast program. Processor 109, among other things, collects in a database (not shown) program guide data associated with different TV programs which are not pre-staged (including TV program 201 in this instance) from an application server, which may be different from the sources of the TV programs themselves (as will be discussed below in connection with FIGS. 7-9, in some instances, program guide data can be obtained from an external source such as Tribune Media Services, Inc., described at http://www.tribunemediaentertainment.com/products/tv_onscreen.shtml, and known to the skilled artisan). Each program when presented to processor 109 is identified by a program designation, which may be used to locate the corresponding program guide data. In particular, processor 109, while processing TV program 201, may locate the corresponding program guide data to create, in real time, the metadata file associated with TV program 201. The metadata file thus created includes such data as the title, rating (e.g., G, PG-13, R, etc.), names of the producer, director, and actors, duration of the program, program type (e.g., situation comedy), and so on.

Note that, as used herein, "staging" involves the process of converting video streams to a digital (if not already in digital format), constant bit-rate (CBR), appropriate group-of-pictures (GOP) structure (15 or 30), Internet-protocol (IP) format (for multicasting through a network). Staging is applicable to a variety of scenarios, including Switched Digital Video (SDV), Digital/Analog Simulcast, NDVR/NPVR, video over IP/IPTV, and the like, and works in essentially the same fashion in all the exemplary cases.

It should be noted that where program 201 is not an initial broadcast program, which may also be pre-staged, commercial segments 221 and 227 may not contain the commercials originally provided by the program provider. Rather, program 201 may, in some instances. be repackaged with after-market commercials, which may be targeted to the user, and which may even be injected anywhere in the program with no regard for original segments 221 and 227 in terms of their timing, duration, or quantity. In the event that program 201 is pre-staged, the program content comes with the corresponding metadata file and trick files associated with the program. Further, in some instances, processor 109 stores the created or pre-staged asset including the metadata file and trick files associated with a program according to its program designation in asset storage (not shown), which may reside in library manager 113 described below.

The transport streams generated by processor 109, which contain live TV programs in this instance, are fed to cache manager 111. The latter includes a cache memory (not shown), e.g., a disk cache, having a memory capacity on the order of terabytes. Manager 111 copies the transport streams onto the cache memory, and also forwards the same to library manager 113 for long-term storage. The latter includes library storage having a memory capacity on the order of hundreds of terabytes, much larger than that of the cache memory, such that the cache memory stores the last Y hours' worth of the TV programs while the library storage stores the last Z hours' worth of the TV program, where the value of Z is much greater than that of Y. It suffices to know for now that use of the cache memory, which affords faster access to its content than the library storage, facilitates a speedy retrieval of a requested program in the event of a "cache hit," i.e., the requested program being within the last Y hour broadcast. Conversely, a "cache miss" requires locating the requested program in the library storage, thereby incurring a delay in the retrieval of the program.

Network controller 125, among things, assigns resources for transporting program materials to set-top terminals and communicates various data, including system information, to and from the terminals. Upstream data from a set-top terminal 158 to network controller 125 is communicated via a reverse passband, e.g., a 5-40 MHz band, of a coaxial cable. The reverse passband comprises reverse data channels (RDCs) having a 1 MHz bandwidth in this instance, through which quaternary phase shift keying (QPSK) signals containing upstream data are transmitted. It should be noted that the 1 MHz bandwidth allocated for an RDC here is for illustrative purposes only. It will be appreciated that a person skilled in the art may allocate other bandwidths for RDCs depending on the actual implementation. A set-top terminal utilizes an RDC for sending both application data and control messages. For example, the Digital Audio Visual Council (DAVIC), a standard setting organization, has defined a contention-based access mechanism whereby multiple set-top terminals share an RDC. This mechanism enables the set-top terminals to transmit upstream messages without a dedicated connection to a QPSK demodulator. The mechanism also provides equal access to the set-top terminals that share the RDC, and enables detection and recovery from reverse path collisions that occur when two or more of the terminals transmit an upstream message simultaneously. As also specified by DAVIC, for communications purposes, the set-top terminals and network controller 125 are identified by the Internet protocol (IP) addresses assigned thereto. However, these IP addresses may be randomly assigned each time when system 100 is reconfigured. As a result, the IP address of a set-top terminal 158 or controller 125 may change after a system reconfiguration. Nevertheless, each set-top terminal 158 and controller 125 is also assigned a media access control (MAC) address on a permanent basis, surviving any system reconfiguration.

Downstream data from network controller 125 to a set-top terminal 158 is communicated via forward data channels (FDCs). These channels, often referred to as "out-of-band" channels, may, for example, occupy the 70-130 MHz band of a coaxial cable. QPSK signals containing system messages to a set-top terminal 158 are transmitted through an FDC having a 1 MHz bandwidth in this instance. It should be noted that the 1 MHz bandwidth allocated for an FDC here is for illustrative purposes only. It will be appreciated that a person skilled in the art may allocate other bandwidths for FDCs depending on the actual implementations.

When a user at a set-top terminal, say, terminal 158-1, turns on the tuner associated therewith and selects a particular program channel, say, program channel 2, or changes from another channel to channel 2, terminal 158-1, in a well known manner, scans for any transport streams transporting programs to the neighborhood. In system 100, each transport stream is identified by a unique transport stream identification (TSID).

Figure 3:
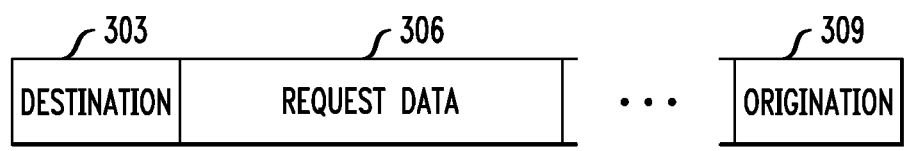
FIG. 3 illustrates a request for program material from a set-top terminal in the system of FIG. 1.

Continuing the above example, once the TSIDs of the transport streams are detected, terminal 158-1 sends, through QPSK modem pool 127, a request for program channel 2 material. Reference should also be had to FIG. 3, which illustrates one such request (denoted 300) sent from a set-top terminal to network controller 125 via an RDC. As shown in FIG. 3, request 300 includes, among other things, destination field 303, which in this instance contains the IP address of network controller 125 for which request 300 is destined; request data field 306 which contains data concerning the detected TSIDs and the requested program channel material, e.g., program channel 2 material in this instance; and origination field 309 which in this instance contains the P (and/or MAC) address of terminal 158-1 from which request 300 originates.

Figure 4:
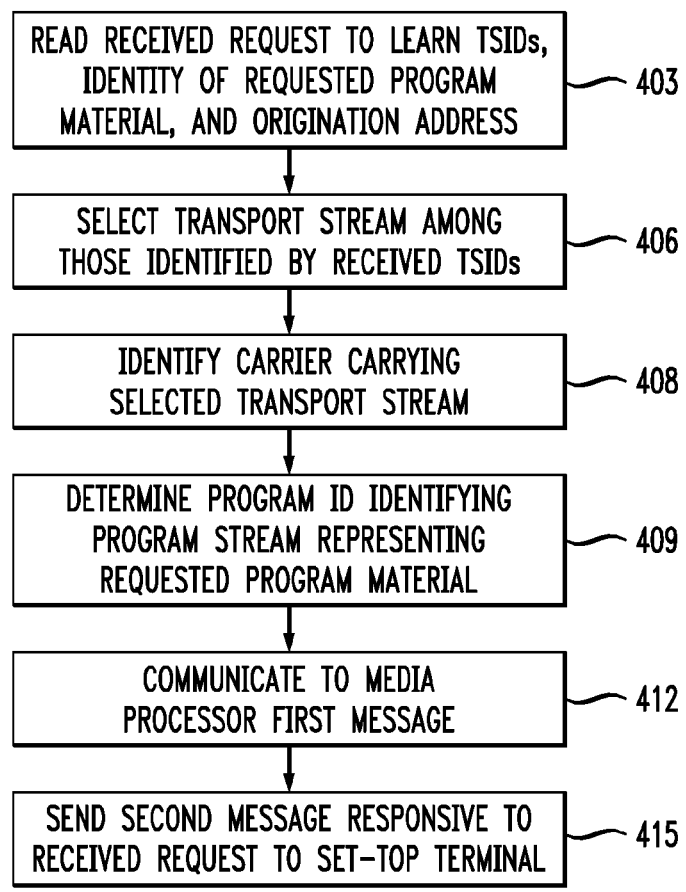
FIG. 4 is a flow chart depicting a process for providing program material in response to the request of FIG. 3.

Reference should now also be had to FIG. 4. After receiving request 300, network controller 125 reads the received request to learn the TSIDs, the identity of the requested program material, and the origination address therein, as indicated at step 403 in FIG. 4. Network controller 125 communicates with media processor 119 (also referred to herein as a video-on-demand (VOD) server) to determine the capacity required for transmitting the requested program material. Based on the required capacity, controller 125, at step 406, selects a transport stream, among those identified by the received TSIDs, which is suitable for transporting the requested program material. Controller 125, at step 408, identifies the carrier carrying the selected transport stream.

Figure 5:
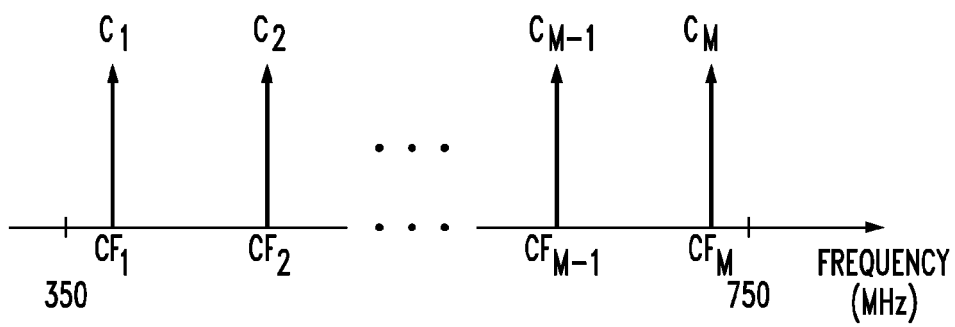
FIG. 5 illustrates selected carriers for transmitting program materials in a forward passband of the system of FIG. 1.

Referring also back to FIG. 1, modulator bank 123 in this instance is located in hub 120, connected to head-end 105 via IP transport on the one hand, and to HFC cable network 140 on the other hand. Bank 123 includes multiple modulators, each of which is used to modulate transport streams onto different carriers. Each modulated carrier carrying a transport stream is transmitted through an associated transmission channel. With further reference now to FIG. 5, M carriers are illustrated therein, designated as $C_1$ through $C_M$, associated with M transmission channels in the forward passband. As shown in FIG. 5, the carrier frequency of $C_1$ is denoted $CF_1$; the carrier frequency of $C_2$ is denoted $CF_2$; and so on, with the carrier frequency of $C_M$ denoted $CF_M$. In this example, each program stream may contain 4.2 Mb/s video and audio program data. By using a 256-quadrature-amplitude-modulation (256-QAM) technique and 6 MHz transmission channel, each modulator in modulator bank 123, in this instance, may modulate nine or more program streams, multiplexed in a transport stream, onto the corresponding carrier. The resulting modulated carrier is transmitted through the transmission channel associated with the carrier.

Network controller 125 may include therein a carrier assignment table which lists, for each carrier, the TSID of the transport stream carried thereby. The carrier identification by network controller 125 at aforementioned step 408 may be achieved by looking up, from the table, the carrier associated with the TSID of the selected transport stream. Based on the requested program channel, network controller 125, at step 409, determines the program ID identifying the program stream representing the requested program material, i.e., program channel 2 material in this instance, which is then multiplexed with other program streams in the selected transport stream. At step 412, network controller 125 communicates, to media processor 119, a first message containing the identity of the modulator in modulator bank 123 which corresponds to the carrier, say, $C_1$, just determined, and the program ID associated with the requested program channel material just determined. At step 415, network controller 125 sends, through QPSK modem pool 127, a second message, responsive to the received request, to set-top terminal 158-1, which is identified by the origination IP (and/or MAC) address in field 309 of request 300. This second message traversing an FDC contains the information concerning the carrier frequency, i.e., $CF_1$ in this instance, to which terminal 158-1 should tune to receive the appropriate transport stream, and the program ID for extracting the desired program stream, representing in this instance program channel 2 material, within the transport stream.

In response to the first message, processor 119 directs cache manager 111 to deliver a copy of the program stream representing the requested program channel material thereto and causes the program stream to be multiplexed with any other program streams already in the transport stream identified by the selected TSID. In addition, processor 119 causes switching unit 117 to switch the resulting transport stream to the modulator corresponding to the carrier $C_1$. Accordingly, the modulator modulates the carrier $C_1$ with the received transport stream, and causes transmission of the modulated carrier through the transmission channel associated with $CF_1$.

Based on the information in the second message, terminal 158-1 tunes to the carrier frequency $CF_1$ to receive the transmitted transport stream, and extracts therefrom the desired program stream, representing program channel 2 material in this instance. In a well-known manner, terminal 158-1 converts the extracted program stream to appropriate signals for the associated TV to play program channel 2 material.

While the program channel 2 material is being played, terminal 158-1 continuously registers the last I-frame identifier in the received transport stream. From time to time, terminal 158-1 sends a "heartbeat" containing the IP (and/or MAC) address identifying terminal 158-1 and the last I-frame identifier to media processor 119. Processor 119 keeps, for terminal 158-1, a record identified by the IP (and/or MAC) address of terminal 158-1, and tracks the program being transmitted to terminal 158-1 and its I-frame progress. When processor 119 no longer receives heartbeats from terminal 158-1, e.g., because of an off state of the terminal, processor 119 may cause the transmission of the transport stream to terminal 158-1 to be halted.

Figure 6:
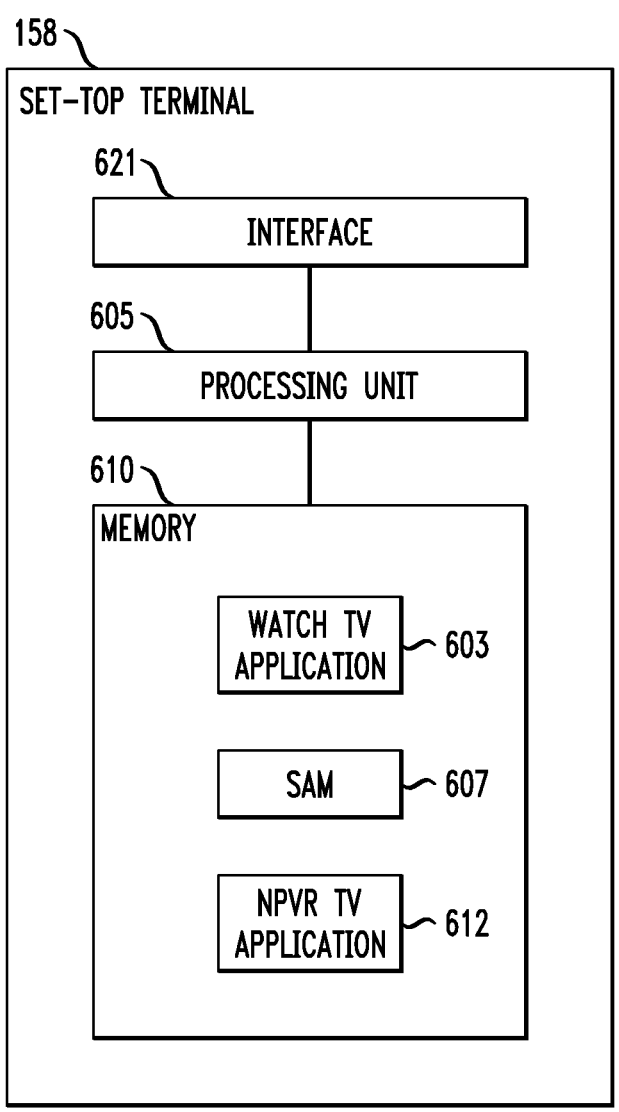
FIG. 6 is a block diagram of a set-top terminal.

Refer now also to FIG. 6. A conventional "Watch TV" application (denoted 603 in FIG. 6) is installed in a set-top terminal (denoted 158) to service those program channels (or programs) afforded a traditional broadcast service. It should be noted that set-top terminal 158 here generically represents one of set-top terminals 158-1 through 158-L. Watch TV application 603, residing in memory 610, provides such well known functions as channel navigation control, channel selection in response to a channel change event, etc. A channel change event occurs when a user at set-top terminal 158 issues a command to change from one program channel to another. Such a command may be issued, say, using a short-range remote control (not shown), which signal is receptive by set-top terminal 158. Memory 610 in this instance comprises one or more caches, disks, hard drives, non-volatile random access memories (NVRAMs), dynamic random access memories (DRAMs), read-only memories (ROMs), and/or Flash ROMs. In a preferred (but non-limiting) approach, terminal 158 also provides DVR functionality, and may be owned and/or operated by the cable network operator. In other instances, separate set-top terminals are associated with DVRs, which may be owned and/or operated by the cable network operator or someone else. At present, it is believed that combining DVR and STB functionality in a single integrated unit is preferred; however, while preferred, this approach is non-limiting and use of separate DVR and STB units is within the inventive scope.

For example, in memory 610, NVRAM may be used for storage of a user's settings and set-top terminal configuration settings, such as parental control codes, favorite channel lineups, set-top terminal setups, channel maps, authorization tables, and FDC address assignments. DRAM may be used for most application and operating system storage requirements, such as stacks, heaps, graphics, interactive program guide data, marketing data and usage data, and functions such as MPEG-2 video decompression, DOLBY DIGITAL® (registered mark of Dolby Laboratories Licensing Corporation, San Francisco, Calif.) Adaptive Transfer Coding 3 (AC-3) audio decoding, and video manipulation. ROM may be used for storage of the operating system. Flash ROM may be used for storage of resident application software, as well as patches of the operating system and application software, which software and/or patches are downloaded to set-top terminal 158 from head-end 105 after set-top terminal 158 has been deployed at the user's premises.

Processing unit 605 orchestrates the operations of set-top terminal 158. It executes instructions stored in memory 610 under the control of the operating system. Service application manager (SAM) 607 forms part of such an operating system of terminal 158. SAM 607 is responsible for, among other things, monitoring channel change events; administering channel, service and other tables in terminal 158; and maintaining a registry of applications in terminal 158. One such application is the aforementioned Watch TV application 603 which is invoked to service a traditional broadcast channel (or program). Another possible application, mentioned for completeness, is "NPVR TV" application 612 which is invoked to service NPVR enabled channels (or programs), and which may be downloaded from head-end 105 to memory 610. Communication with head end 105 may be through interface 621. Again, the remote DVR control aspects of the invention are applicable to cable TV networks with or without NPVR functionality.

It will be appreciated that the description thus far, in association with FIGS. 1-6, has presented an example of one specific environment in which one or more techniques of the invention may be practiced. However, the example is not to be taken as limiting. Inventive techniques may be practiced in many different environments. For example, one or more inventive techniques can be employed with a system of the kind that incorporates switching techniques to only send signals for programs actually being watched, as set forth in US Patent Application Publication 2003-0056217, kind code A1, of Paul D. Brooks, published Mar. 20, 2003, entitled "Technique for effectively providing program material in a cable television system," the disclosure of which is expressly incorporated herein by reference for all purposes. Further, one or more inventive techniques can be employed with a system that optimizes bandwidth utilization via self-monitoring. Yet further, in the system 100, the network transport is illustratively realized using HFC cable network 140. However, other networks such as digital subscriber line (DSL) networks, Ethernet networks and satellite networks may be used instead. Indeed, in general terms, any wireless network may be used for transport and DVR communication back to the head end. This may be inclusive but not limited to CDMA, GSM, Wi-Fi, and WiMAX technologies; basically any network where voice and/or data may be transported. Even further, system 100 is disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors. Thus, it should be kept in mind that techniques of the invention may be advantageously employed wherever DVRs or the like are to be remotely controlled from personal computers, cellular telephones, personal digital assistants (PDAs), and the like.

It should be noted at this point that commonly assigned US Patent Application Publication 20070050818, Ser. No. 11/215,942, filed Aug. 31, 2005, of Berger et al. discloses a Remote DVR Manager. The disclosure of the aforesaid US Patent Application Publication 20070050818, Ser. No. 11/215,942, filed Aug. 31, 2005, of Berger et al. is expressly incorporated herein by reference for all purposes. Further, it should also be noted at this point that reference is made herein, in one or more examples, to a cable television network service provider; however, this is but one non-limiting example of a content (network) provider, which may include, by way of example and not limitation, a cable service provider, a direct broadcast satellite service provider, or a telephone service provider offering video content services.

Figure 7:
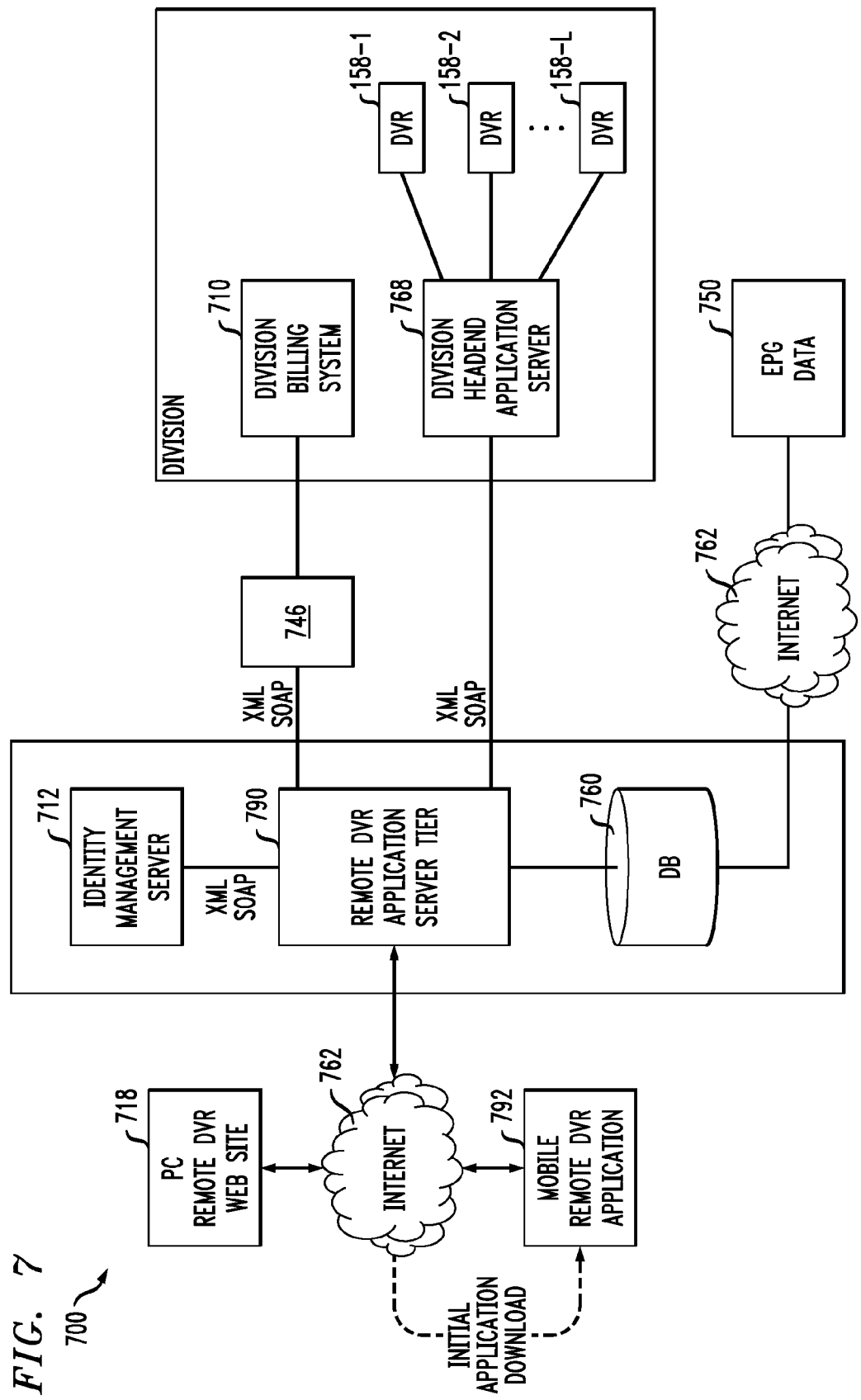
FIG. 7 is a high-level view of an exemplary remote DVR end-to-end architecture, in accordance with an aspect of the invention.

Attention should now be given to FIG. 7, which depicts a high level block diagram of an exemplary inventive system 700. In block 718, a user employs a browser to access a URL, so as to connect to remote DVR application server tier 790 via Internet 762. The identity of the user as a legitimate customer of a cable television provider can be established by accessing identity management server 712 and/or a billing system, such as division billing system 710. In some embodiments, the cable television provider has more than one division, and each division may have a separate billing system. Such systems may not be compatible in terms of format and the like. Accordingly, a translation block 746 (in essence, performing connection and data normalizing functions) may advantageously be provided to receive and transmit queries to and from tier 790 in a single format, while translating communications to and from a number of different billing systems 710. Established customers may have an identity, profile, and the like stored in identity management server 712. Authentication may be based, for example, on two or more factors, such as (i) a user or account name, and (ii) a password. For application to remote devices, discussed elsewhere herein, possession of the device may be treated as equivalent to the first factor.

The user at block 718 wishes to control his or her DVR 158. An application residing in tier 790 can access an electronic program guide block 750, for example, via Internet 762, to obtain an electronic program listing. Optionally, such program information is stored in database 760, which obtains it from electronic program guide block 750. As noted elsewhere herein, the functionality in block 750 may be afforded by a third party provider of programming guide services such as Tribune Media; another example is the service provided by GEMSTAR—TV GUIDE INTERNATIONAL, INC. In such services, each program may be identified by a unique program identifier. For example, an episode of "Home Improvement with John and Mary" scheduled to appear on Wednesday Jul. 11, 2007 at 9 PM EDT would have a unique identification number or code associated with it. DVRs 158 may typically use such numbers or codes to identify programs to be recorded. Advantageously, the other components of system 700 may also use the same numbers or codes to refer to particular programs to be recorded. When a user employing the web application at block 718 selects a program to record, for example, by clicking on its listing in a program grid, server tier 790 establishes a connection to division head end application server 768, indicating that a certain DVR 158 wants to record a certain program. The program may be identified by the aforementioned number or code. Head end server 768 communicates with the appropriate DVR 158 and instructs it to record the desired program. The communication can be carried out, for example, as described above with respect to FIG. 1.

The architecture depicted in FIG. 7 advantageously allows the user accessing the web application at block 718 to directly access his or her DVR 158 in real time, via Internet 762, server tier 790, and head end server 768 communicating with the DVR 158 over the cable television network. This allows, for example, rapid retrieval of a list of programs already recorded on DVR 158 and/or scheduled for future recording on DVR 158. The most accurate rendition of such a list of programs will be that stored on the DVR 158 itself, as opposed to some list that might be persisted elsewhere and be out of date. This type of architecture further allows real-time conflict resolution; for example, where there is insufficient storage space on DVR 158, or another program is already scheduled to be recorded in the time slot of a program just selected. Non-limiting examples of conflicts that can be dealt with include insufficient storage, too many scheduled recordings, and priority conflicts (single episodes or series). The user can therefore select precisely which stored programs he or she wants to delete to make room for the new selection, or which of the two conflicting programs he or she wants to record. The user may also be guided through a case where the user does not have rights to perform the desired act—for example, the user could be prompted to purchase the rights on a one-time or subscription basis, depending on the nature of the rights—in general, adequate provision can be made for digital rights management (DRM). In one or more embodiments of the invention, mobile device users can flexibly manage these types of conflicts by, for example, setting priorities, editing the recording list, and so on. In one or more embodiments, conflict resolution can be handled in a similar manner for both PC-based and wireless remote access. Advantageously, in one or more non-limiting embodiments, real-time conflict resolution is facilitated by having the same provider supply both the DVR and the content (or other) network over which the DVR is accessed for control.

As used herein, "real time" refers to a case where a desired action happens within 30 seconds, and preferably within 5 seconds, from the input intended to cause the action—for example, when a selection on a PC or wireless remote DVR interface screen is clicked, the corresponding action, such as selecting a program for recordation, occurs within the specified time.

Another significant feature that may be included in one or more instances of the invention is the ability to manage a number of users wishing to control the same DVR(s) 158 (by way of example and not limitation, a parent or parents and one or more children living in the same house). It may be desirable to allow some users (for example, children) less authority than other users (for example, parents) in terms of which programs, channels, or ratings of programs may be recorded, which DVRs may be controlled, whether choices of other users can be over-ridden, and so on. Each of the users may be provided with a different account, or the users may share a single account but have different levels of authority within the account (for example, by providing sub-accounts within an account). In some instances, provision can be made for establishing "super user" permissions, whereby selections made by all other users may be overridden. Such a "super user" may be the individual who initially sets up the account, for example. Other users may be afforded "lesser user" permissions, which may, for example, be provided in one or more classes allowing less and less authority than that of the "super user." Some examples of conditions that might be established are as follows: all family members can program family room DVR, but only parents can program parents' bedroom DVR; children are allowed to program whatever they wish, but only from a subset of channels, for example, channels showing only wholesome family programming; children cannot see what is programmed on the DVR in the parents' bedroom; children are allowed to program whatever they wish, but only from a subset of ratings, for example, programs rated "TVY" or "TVG" but not those rated "TV14." The type of functionality described in this paragraph may be advantageously incorporated into identity management server 712. A profile may be stored for each user, in storage accessible to identity management server 712, and such profile may specify the level of permission that such user has to control one or more DVRs in a home or the like. Such profiles may be set up, for example, by having remote DVR application server tier 790 provide a GUI accessible to a super user, for example, via web access per block 718, and such super user may then create identities or the like for other users, such as other family members, and may establish permission levels for such other users.

In order to set up the rules controlling the levels of permission, etc., it is typically necessary to determine how many DVRs 158 are present within the home, so that it can be determined who is allowed to access which DVR(s). Advantageously, the architecture depicted in FIG. 7 allows such information to be obtained from the division head end application server 768, for example, via an XML SOAP interface to be discussed further below (XML SOAP can also be employed between blocks 790 and 746). The information obtained may include, for example, how many DVRs are in the home, and their identities (for example, MAC addresses or names they have been given, such as "family room DVR," "master bedroom DVR," and so on. Information can also be obtained from block 750 (possibly stored in block 760); for example, channel lineups and the rating for each program, so that the aforementioned control based on rating can be implemented. Particular channels may also be white listed or black listed; for example, wholesome family channels are white listed whereas channels featuring suggestive or violent content are blacklisted. Such information including permitted channels and/or ratings may be saved in an individual's profile.

Figure 10:
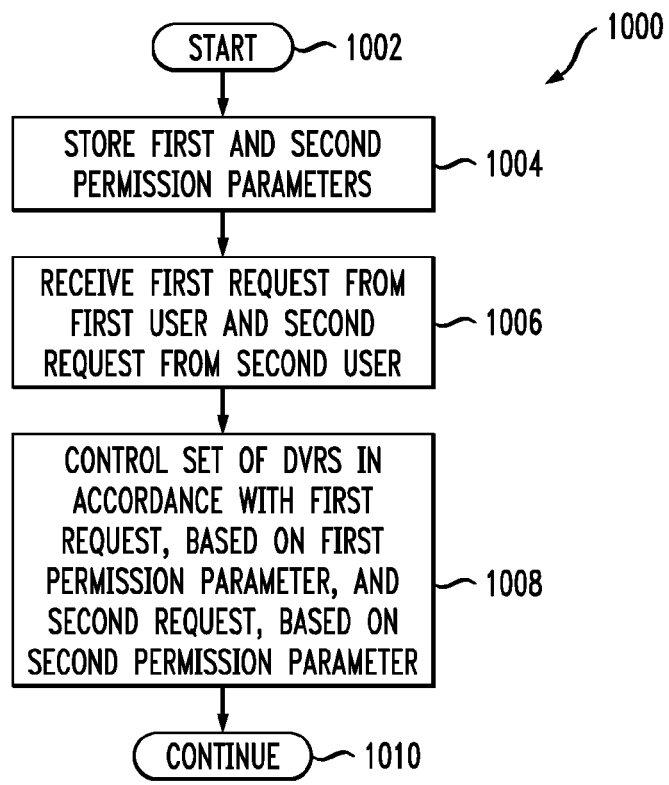
FIG. 10 is a flow chart of an exemplary method of controlling a set of digital video recorders, according to still another aspect of the invention.

Thus, with reference now to FIG. 10, which depicts a flow chart 1000 of an exemplary method for controlling a set of one or more digital video recorders, after beginning at block 1002, such method may include storing at least a first permission parameter associated with a first user of the set and at least a second permission parameter associated with a second user of the set, as at block 1004. The second permission parameter may define a different level of permission for controlling the set than the first permission parameter does. The method may also include receiving, at one or more servers (for example, 790), a first request to control the set from the first user and a second request to control the set from the second user, as shown at block 1006. Furthermore, as shown at block 1008, the method may include controlling the set in accordance with: (i) the first request, based on the first permission parameter, and (ii) the second request, based on the second permission parameter. The controlling may include communicating with the set over a network. Processing continues at block 1010. The permission parameters may be used to implement the various types of management features just described, and may be stored, for example, in block 712. An exemplary system that may carry out the method includes a content network (also generally referred to herein as a content-based network), such as a cable television network with block 768, an identity management module such as block 712 to store the parameters, and a DVR control application module such as server tier 790.

In some instances, as will be discussed in greater detail below, control capability may be available from one or more wireless devices, as indicated at block 792. Such functionality may be provided, for example, by downloading a suitable application to the wireless devices, referred to as a "Mobile Remote DVR Application."

Figure 8:
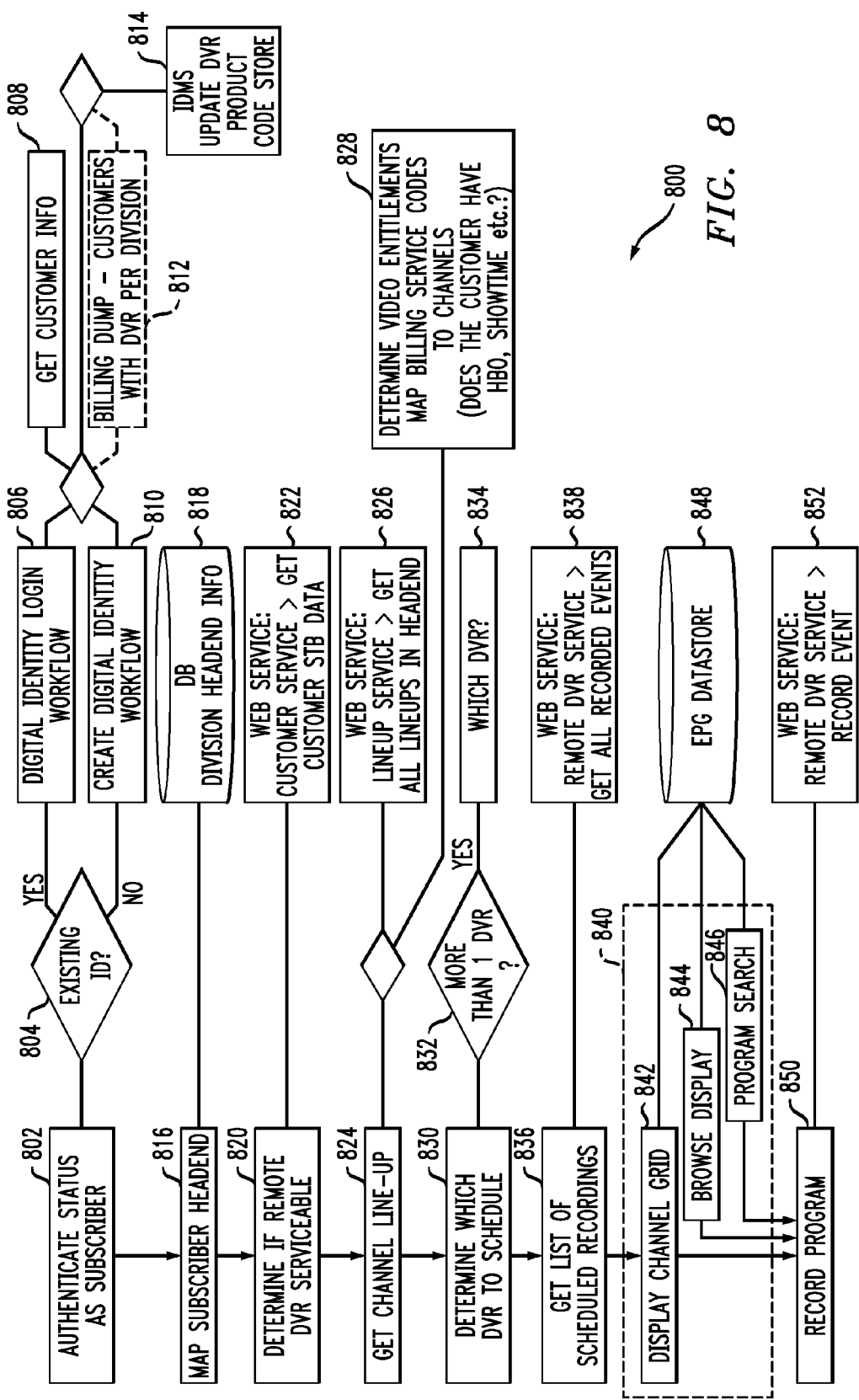
FIG. 8 is an exemplary remote DVR application session workflow, in accordance with another aspect of the invention.

FIG. 8 shows an exemplary workflow diagram 800. Blocks in FIG. 8 may correspond, for example, to steps in a method. At block 802, the method authenticates a user's subscriber status. As per decision block 804, if the user has an existing identity in the system, he or she may be logged in at block 806, whereas if the user does not have an existing identity, one can be created at block 810. As shown at block 808, customer information can be obtained from billing system 710, for example, by functionality within block 746, as described above. Alternatively, as shown at block 812, a "billing dump" can be obtained, for example, by human interaction with billing system 710. At block 814, pertinent information, such as the above-discussed profile, is stored for access by identity management server 712. Customer information may include, for example, e-mail address, DVR equipment list, name and address, screen name, personalization data, sub-accounts, and the like.

At block 816, system 700 determines what head end serves the particular user. It will be appreciated that systems other than the exemplary systems 700, 900 described herein may also be used to carry out method steps. Larger divisions may have more than one head end. This information may be obtained, for example, from a database in block 768 (not separately illustrated), as shown at block 818. At block 820, system 700 can determine whether the remote DVR 158 is serviceable. This can be carried out, for example, by retrieving information relating to the user's STBs, via a web service, from head end server 768, as shown at block 822. This results in the generation of a list of one or more DVRs of the user that can be reached. In block 824, system 700 obtains the appropriate channel line-up. In some instances, head ends have multiple channel line-ups, and all those stored in the pertinent head end may be obtained. If there is only a single line-up; it may be presented to the user; if more than one line-up, the user may be queried which line-up he or she has access to. In one or more instances, the line-ups(s) may be advantageously obtained via a web service, as shown at block 826. At block 828, system 700 determines video entitlements, for example, if a premium channel is present in the user's channel line-up, does the user have access to that premium channel? Thus, in some instances, channel line-ups may be filtered based upon a subscription package.

In block 830, system 700 determines which DVR to schedule. As shown at block 832, this question typically arises only when more than one DVR is available; if this is the case, at block 834, the user can be queried regarding which DVR he or she wishes to access. As discussed above, the different DVRs in the user's home may be named. In some instances, the user's selection of or naming of the DVRs may be facilitated by showing him or her the current schedule for that particular DVR (since the user may not know the MAC address of the particular DVR). In block 836, system 700 obtains a list of scheduled recordings, preferably directly from DVR 158, as discussed above. This list may display shows currently recorded and/or shows scheduled to be recorded, and, in one or more embodiments, can be obtained via a web service, as shown at block 838.

In block 840, the user is helped to find something he or she wishes to record, for example, by one or more of display of a channel grid, as at block 842; a browse display (that is, a list of all the programs for the next predetermined time period on a given channel), as at block 844; and a program search (for example, a text search for "football"), as at block 846. The program data can be obtained, for example, from the EPG data block 750 or the database 760, as shown at block 848. In block 850, the user specifies which program he or she wishes to record. At block 852, system 700 issues instructions to cause the selected program to be recorded; for example, by using a web service that specifies the program identification discussed above, and the identity of the DVR (for example, its MAC address or other indicia), causing the desired program to be placed in the correct DVR's record queue.

It should be noted that in one or more embodiments, it will be advantageous to ensure that electronic program guide data accessed by the web site(s) (or wireless devices) is consistent with guide data on DVRs 158. The majority of DVR users are accustomed to using the electronic program guide (EPG) to set up future recordings. As a result, the EPG is a significant component in one or more embodiments of a remote DVR platform. The EPG should preferably provide access to program information for the same time period as available on the STB/DVR, for example, two weeks. This information may be provided using a combination of information cached or information accessed in real time based on a user request (for example, one day cached on the device, such as a mobile device discussed below, and up to two weeks accessible upon a request). The EPG may provide the channel name, channel number, date, show start time, program duration, program rating, program description (containing the same fields that are available on the user's Set Top Box, e.g. title, description, actors, production date, etc.), Closed Captioning availability, and secondary audio programming (SAP) availability. The EPG may show dates and times of upcoming repeat episodes of the same or series title, with description, and may show dates and times of upcoming new episodes of the same or series titles, with description. The EPG preferably employs the same information database as the home EPG, and preferably displays the channels and services that are available on the home STB/DVR. The EPG should allow subscribers to purchase additional home video services from the remote application, such as subscribing to new programming packages or other products. For programs that have been previously recorded or are scheduled for recording, the EPG should provide the channel name, channel number, original air date, show start time, program duration, program rating, program description (containing the same information that is available on the users Set Top Box), the "Save until" date, Close Caption availability, and SAP availability.

The EPG may provide a show preview environment that plays previews of recorded or upcoming programs in full screen mode, and may also provide a show preview environment that plays previews of recorded or upcoming programs in Picture-in-Picture mode. The EPG may provide a list of related content on television, video on demand, movies on demand, or other products available from the operator of a cable television network, its business partners, or third parties. Further, the EPG may provide links to related items for purchase, such as digital video disks (DVDs), books, digital media downloads (shows, movies, songs and the like), compact audio disks (CDs), etc. Yet further, the EPG may contain links to guidance from third party sources such as the Internet Movie Database (IMDB) (movies), a web site such as TV.com, Common Sense Media (Family Friendly Ratings), and the like, and the EPG may contain links to related entertainment & news features on a web site operated by the cable television provider, its business partners, or third parties. Even further, the EPG may contain a list of top rated programs, and may recommend program to the user based on a profile or recommendation engine.

Additional notes related to the desirable consistency of EPG data between the STB/DVR and remote DVR application(s), will now be provided. In some instances, a program listings and channel lineups aggregation server can be monitored, maintained and managed in a centralized location on the cable television. wide area network. All of the division head end servers 768 in the divisions will send their program listings and channel lineups to this aggregation server on a regular basis, where they can be made available to other applications which may need this data. This exemplary approach can help to ensure that customers see consistent program data and channel lineups in other client applications (e.g., Remote DVR) as they will see on their TV screens at home.

Additional functionality that may be provided within system 700 will now be described. In addition to selecting shows to record from a grid, a user may have the opportunity to select a show to record from search results or the like, to set a reminder for upcoming shows (posted on or sent to a web site, fixed or mobile phone, PDA, and so on), to set a channel and time slot instead of a specific show, and to confirm or cancel recordings. In some instances, functionality is provided wherein a user may select a show for recording by depressing a key while watching the show. Various priorities may be set and changed as desired, for example, selections for whether a program is to be saved or may be written over when space is needed; priority order for series that are scheduled to be recorded; deletion orders for shows to be deleted, and so on. Further, users may be given the choice to modify the start or finish time for recordings already scheduled, the time a recording is scheduled to be retained, set or modify the number of episodes in a series recording that are to be saved, and set or modify whether new episodes or all episodes in a series are to be recorded. The listings of shows already recorded, or scheduled for recording, may be displayed, for example, by date and time or title. A log may be kept of past actual recordings, deletions, and so on, and users may be allowed to review lists of deleted episodes, previously scheduled recordings not recorded due to a conflict and/or due to insufficient disk space. A flag may be provided to indicate recorded shows that will soon be deleted. Users may be given the opportunity to suggest programs to friends and/or relatives, for example, by sending a link to the person's STB, PC, mobile device, etc. (such link might allow the friend or relative to easily schedule the recommended program for recording). Further, a user may be given the opportunity to set up a "wish list" of desired programs or of desired program attributes, and suitable recommendations may then be generated by the system and the user advised of same. Recommendations may be developed, for example, by a recommendation engine, which may recommend shows available by cable television, video on demand, movies on demand, wireless, and may recommend other content opportunities such as digital media downloads (including but not limited to shows, movies, music, wallpapers, ring tones, and games) for Set Top Boxes, PCs, fixed wireless, voice over Internet protocol (VoIP), or mobile wireless devices.

In addition to scheduling recordings, the application may allow the user to schedule a time and date for automated playback of a recording on a DVR connected television set, and/or may allow the user to schedule a time and date for automated playback of a recording on a PC connected by a home network to the DVR, or to a remote Internet-connected PC, where the playback may be from a real time stream from the DVR or a cached file deposited to the wireless device over a wired or wireless connection. The file may require transcoding to a different format. Further, the application may allow the user to schedule a time and date for automated playback of a recording on a mobile wireless device, where the playback may be from a real lime stream from the DVR or a cached file deposited to the wireless device over a wired or wireless connection. Again, the file may require transcoding to a different format. Yet further, the application may allow the user to playback a recording on a mobile wireless device immediately using a live stream from the DVR. Yet again, the file may require transcoding to a different format. The application may allow the user to send a copy of a recording to a mobile wireless device for viewing at an unspecified time. Still again, the file may require transcoding to a different format. The application may allow the user to send a copy of a recording to a remote Internet-connected PC for viewing at an unspecified time. As before, the file may require transcoding to a different format Thus, a method for controlling at least one digital video recorder interconnected with a content network can include the step of querying at least one server to obtain program data from the server (for example, from block 750) and DVR data from the digital video recorder 158. A further step can include receiving the program data from the server and the DVR data from the digital video recorder. The DVR data can be obtained from the digital video recorder 158 substantially in real time over the content network (including block 768). Further, the method can include displaying the program data and/or the DVR data on a separate device (for example, the PC in block 718) in communication with the cable television network. As shown in FIG. 7, the device (PC 718) is in communication with the content network through internet 762 and server tier 790. The method can still further include controlling the at least one digital video recorder 158 by selecting a user-operable function from the program data and/or the DVR data on the separate device. In general terms, the "separate" device refers to a device other than something like a television monitor connected directly to the DVR.

Furthermore, a system for controlling at least one digital video recorder 158 with another (separate) device, such as the PC in block 718, can include a content network, including block 768, coupled to the at least one digital video recorder 158, and a DVR control application module, such as server tier 790, coupled to the content network and the device, and configured to obtain program data, obtain DVR data from the digital video recorder (substantially in real time over the content network), facilitate display of the program data and/or the DVR data on the device, and control the at least one digital video recorder by receiving a selection of a user-operable function from the program data and/or the DVR data on the device.

Figure 9:
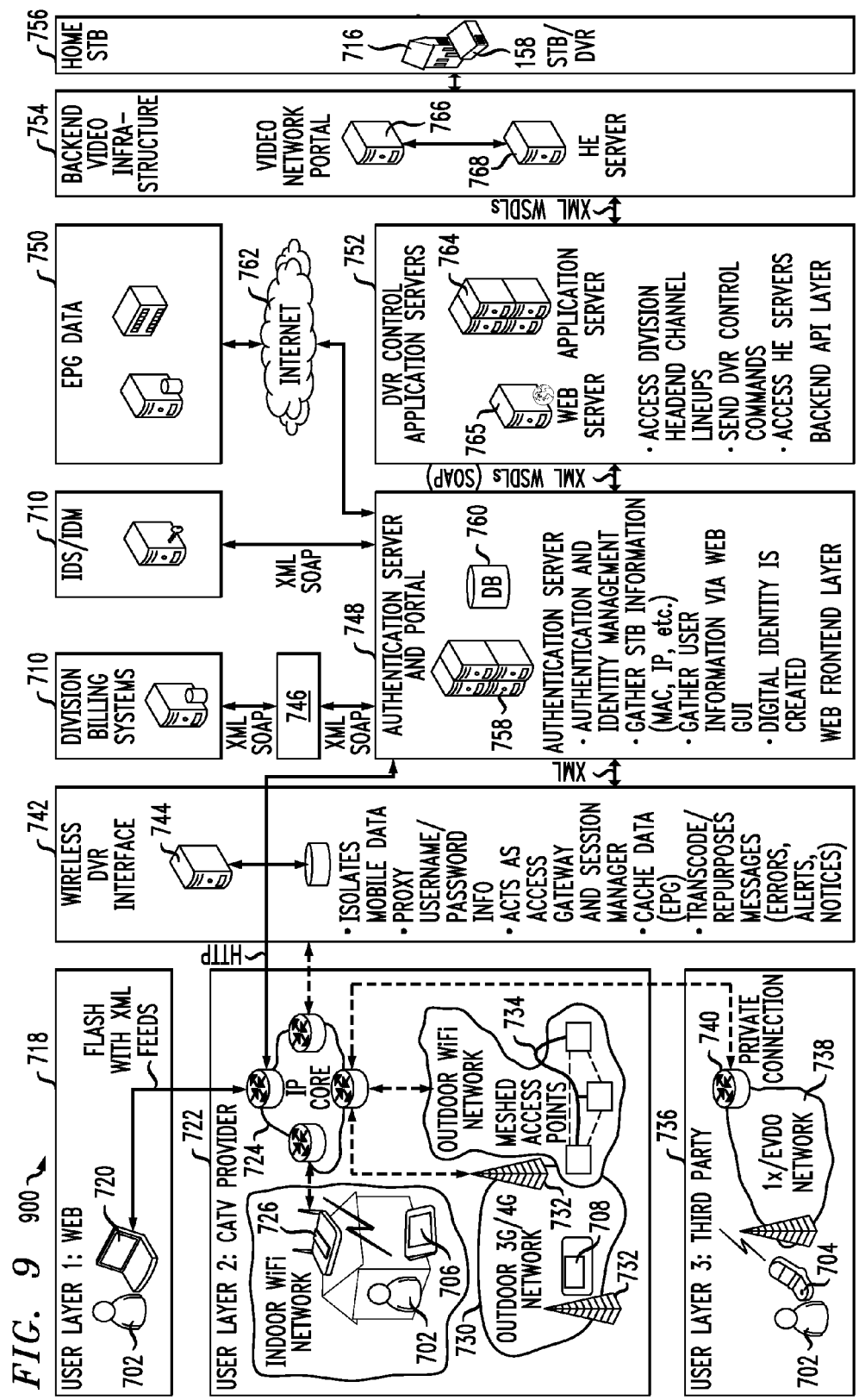
FIG. 9 is a detailed view of an exemplary remote DVR end-to-end architecture (generally similar to FIG. 7) showing remote control via remote wireless devices, in accordance with yet another aspect of the invention.

In one aspect, exemplary inventive techniques provide a mechanism including a set of processes, a set of interfaces, and a set of logical sequences of events which take place to allow a DVR customer to control his or her DVR using a mobile device such as a cellular telephone, personal digital assistant (PDA), wireless multimedia device, capable of playing audio and/or video content, and the like. FIG. 9 shows an exemplary system 900 implementing exemplary inventive processes. System 900 represents one possible specific instance of system 700, and the same numbers have been used to refer to like components throughout. The exemplary system includes existing infrastructure in a CATV system, together with additional domains implementing inventive techniques. A number of different activities enable inventive DVR control of DVR (set top box) 158 in the home 716 of user 702. User 702 logs in using a user ID (identity) and password and his or her DVR information is presented on a mobile device such as cellular telephone handset 704 or PDAs 706, 708. Reference to PDAs 706, 708 is intended to broadly encompass similar devices such as an Internet Tablet or Internet Browsing Device, as well as Multi-media devices. Preferably, whenever the user 702 attempts login, an audit is carried out to make certain that the user is a valid DVR customer. As will be discussed further hereinafter, login and checking for account validity, good payment standing, and so on, can, in one or more embodiments, be facilitated by an interface to a billing system 710 and/or an identity management server 712 which contains record storage and login information for users, and allows for single-sign on capability for a multitude of user devices, including, for example, handset 704, DVR 158, etc. The auditing can include, for example, making sure that the user's DVR has not been disconnected and that the user's account is current. An Identity Management Server or IDS may process and store a customer's identity with the cable television operator. Identity Management or IDM refers to the capabilities and/or functions included in IDS, such as identity creation, password management, and account validation.

Once it is determined that user 702 has a valid account and is in good standing, user 702 is preferably presented with personalized information. For example, if the user is a resident of Dallas, Tex., the Dallas, Tex. programming guide is displayed on the user's mobile device 704, 706, 708. The mobile devices 704, 706, 708 employ radio frequency (RF) communication, as opposed to infrared (IR) communication of short-range remote device employed within the same room as the DVR 158. Further, if the user has already programmed his or her DVR to record three television programs, such information is also displayed on the user's mobile device 704, 706, 708. Another example of personalized information is the screen background color for the display on the mobile device, which could be set to match that on the home DVR. Yet another example of personalization is what the user chooses to see first when he or she logs in (inasmuch as the mobile screen is typically smaller than a PC screen and cannot display everything that is seen on the PC screen). In addition to color and font, it should also be noted that the logical flow of the remote DVR application may also follow what is displayed at home. In essence, the entire user interface of the remote DVR application may be based upon the flow and color scheme of in-home DVR service. Thus, in general terms, the menu shown to the user may be customized (personalized) to take into account the physical geographic location of the DVR 158, for example, by presenting a program guide associated with that location.

The exemplary system 900 interconnects a number of new and existing sub-systems and supports the processes and the ordering of events needed to provide the desired DVR control functionality. In one or more preferred but non-limiting implementations of inventive techniques, the DVR 158 can be owned and/or operated by a service provider who provides the user's CATV service (such provider may also provide, for example, one or more of e-mail/Internet connectivity, wireless telephone service such as cellular telephone service, and the like). Thus, the service provider can verify, before providing access to system 900, that the user 702 has a DVR, and is current with fees. Furthermore, where user 702 has multiple DVRs 158 in home 716, user 702 can advantageously be provided with capability to select, via mobile device 704, 706, 708, which of the multiple DVRs 158 in home 716 he or she wishes to remotely control. Integration of the remote control function with the service provider is advantageous, and poses interesting requirements for back-end systems integration and process flow support. It should be noted that FIG. 9 assumes DVR functionality present in STB/DVR 158, but a separate DVR linked to a set-top terminal could also be employed.

A more detailed, block-by-block description of exemplary system 900 will now be provided. Blocks may also be considered to be layers in a system. Functionality of blocks and/or layers may be implemented in modules employing hardware and/or software, as discussed elsewhere herein. Block 718 represents a web-based interface. User 702 accesses his or her cable television (CATV) account and controls his or her DVR 158 via a desktop or laptop PC 720, as described above. Block 722 represents a user 702 interfacing with a backbone CATV Internet Protocol (IP) network of a service provider, such as a CATV provider. The aforementioned network is represented by IP core 724. Modes of interface include local area indoor WiFi network 726 (represented by a wireless router communicating with device 706 and IP Core 724). Other types of interface could include outdoor WiFi network 728 or an outdoor 3G/4G network 730. Again, these networks (for example, cell towers 732 and/or meshed access points 734) can tie into IP Core 724. Block 736 is similar to block 722, except that in block 722, the various indoor and outdoor networks are provided by the same service provider who operates the aforementioned CATV network, while network 738 in block 736 may be operated by a third party other than the CATV service provider. Blocks 722 and 736 are exemplary instances of block 792. A private connection 740 may then be provided to IP Core 724. One non-limiting example of network 738 is an Evolution-Data Optimized or Evolution-Data only, abbreviated as EVDO, network. Thus, in one or more instances, method steps (discussed further below) of obtaining a representation of a request, obtaining a representation of a menu from a back end, and translating the representation, are carried out by a cable television service provider, and the at least one digital video recorder 158 is owned and/or operated by the cable television service provider. Remote wireless devices can operate over a wireless network (including, but not limited to, a cellular network) owned and/or operated by the cable television service provider, as at 722, and/or over a cellular or other wireless network owned and/or operated by a (third party) partner of the cable television service provider, as at block 736. In some instances, the cellular or other wireless network may be operated by a third party who is not a partner of the cable television service provider, in a "network agnostic" manner. Examples of types of wireless networks include GSM, CDMA, WiFi, WiMAX, commercial mobile radio service (CMRS), etc.

In one or more embodiments of the invention, the DVR control application is "network agnostic," that is, the application does not "care" which network it runs on. However, significantly, in one or more embodiments, the application does "care" about the device that it runs on, since mobile devices 704, 706, 708 may have reduced display (screen size, for example), processing, and input/output capability as compared to desktop or laptop computer 720. As long as access to appropriate URLs can be provided, the network used to connect devices to the various front end and back end servers (to be discussed hereinafter) is not necessarily in itself of great concern. Thus, in blocks 718, 722, and 736, user 702 may request a channel line up using a variety of access methods, such as a web-based application, via desktop or laptop PC 720 in block 718; a mobile network operated by the service provider, as at block 722; or a third party network, as at block 736. Remote wireless devices can thus operate over a cellular or other wireless network owned and/or operated by the cable television service provider, as at 722, and/or over a cellular or other wireless network owned and/or operated by a (third party) partner of the cable television service provider, as at block 736.

Attention should now be given to wireless DVR interface block 742, including wireless DVR interface server 744, which is preferably a server running appropriate application software to interface between the front end of system 900, represented by blocks 718, 722, and 736, and the back end of the system, represented by blocks 710, 712, and 746-756. Because computer 720 has quite a bit of display and processing capability, a feature rich browser, and so on, it is relatively easy to move large amounts of data back and forth using extensible mark-up language (XML), hypertext transfer protocol (HTTP), Adobe Flash, and so on, to communicate with back-end servers such as those in block 748 (to be discussed further below). Thus, in one or more embodiments, computer 720 interfaces with block 748 without block 742 functioning as an intermediary. However, mobile devices 704, 706, 708 typically have smaller screen sizes, less memory, and lower processing capability, as compared to computer 720. The solution using computer 720 interfacing directly with block 748 is typically feature-rich and content-heavy. However, the mobile devices typically are incapable of accepting the XML messages that enable the feature-rich, content-heavy solution.

Advantageously, one or more embodiments of the invention provide wireless DVR interface server 744 (for example, a server interfacing with storage, not separately numbered) in block 742 to enable the mobile devices to interface with back-end elements, such as block 748, that are configured to interface with more powerful computers with greater memory and display capability, such as computer 720. wireless DVR interface server 744 is configured to obtain data feeds from the back end (the data feeds being designed for a browser on personal computer 720, that is, intended for the PC domain), and "tune down" such feeds to be compatible with the capabilities of the mobile devices (e.g., limited memory for storing programming data). For example, instead of providing two weeks of programming data, as would be done for computer 720, wireless DVR interface block 742 might pare the two weeks down to two days worth of programming data. Another example would be an error message. An error message sent from the back end to a PC browser might be formatted in a certain way that appears best on a PC browser. Wireless DVR interface block 742 can reformat the error message into a format understandable by the mobile devices. In general terms, wireless DVR interface block 742 can retune the content and protocols from a standard back end to PC format, to a mobile format. This may involve, for example, tuning down the amount of data, resolution, and/or messages being delivered. If the functionality of wireless DVR interface block 742 were not provided, all the messages and content generated by the back end and intended for the PC 720 would have to be duplicated to allow interfacing with the mobile devices. However, wireless DVR interface block 742 is set up to translate the protocols, the type of data, and so forth, to allow the back end communications intended for PC 720 to be "tuned down" to work with the mobile devices 704, 706, 708.

In some instances, a user will have the ability to view the programs which have been scheduled to record (possibly only a subset of such programs, such as those that have been scheduled but have not been recorded yet). This list is another example of something that can be scaled down and/or reformatted so that it is optimally exposed for a wireless device. The ability to reformat certain functions according to the constraints and limitations of the wireless network at hand may be afforded; for example, a 4G network may be able to process more data at greater speeds, therefore the amount of data displayed and how it is delivered may be different than, for example, a 3G network, so as to render optimal usage.

Thus, one or more embodiments provide a system and method for remote DVR control, wherein a back end interfaces with a PC, and wherein a wireless DVR interface block is interposed between the back end and lower-featured (as compared to the PC) remote devices to translate messages intended for the PC into a tuned-down format that can be understood by the mobile devices. In general terms, a method (which maybe computer-implemented) for remote control of at least one digital video recorder 158 includes the step of obtaining, from a remote wireless device 704, 706, 708, a representation of a request for remote control access to the DVR. Responsive to the request, a representation of a remote control menu is obtained from a back end (for example, block 748). The representation of the menu is configured for a personal computer type browser on PC 720. The representation of the menu configured for the personal computer type browser is translated, for example, by block 742, to a modified representation of the menu configured for the remote wireless device. Transmission of the modified representation of the menu to the remote wireless device is facilitated. The steps described can be performed, for example, by the wireless DVR interface block 742; the representation of the menu can be obtained by the wireless DVR interface block from, for example, a remote DVR application server of the back end, such as server 764, discussed elsewhere herein. The "modified representation" can be modified, for example, by reducing the channel listing to a shorter time period that that intended for the PC 720, or for tailoring the data for display on a relatively low-resolution display of devices 704, 706, 708, instead of the relatively high-resolution display of PC 720, and so on.

At least one menu selection can be obtained from the remote wireless device; for example, a command to record at least one television program, which might specify, for example, at least a start time, an end time, and a channel selection.

The skilled artisan, given the teachings herein, can code general purpose computers to perform the functions described with regard to the blocks in FIGS. 7-9. The functionality of the blocks can be provided, for example, via the depicted servers and databases. Exemplary client development programming languages that may be used for the applications in block 722 are Symbian and Windows Mobile, and in block 736, Java; however, in other instances, other languages may be used, such as the BREW development language (or other development platforms not predominant in the market today). These are non-limiting examples, and given the teachings herein, the skilled artisan will be able to develop applications in these or other languages.

By way of review, in blocks 718, 722, and 736, user 702 can request a channel lineup by a variety of methods, including a relatively feature-rich web interface, as at block 718, or via mobile devices, as at blocks 722 and 736. Data from computer 720 may be passed directly to authentication server block 748. Data from mobile devices, per blocks 722 and 736, can be isolated by block 742 before being passed to authentication server 748. In addition to or in lieu of isolating mobile data, block 742 with wireless DVR interface server 744 can perform any one or more of handling proxy username and/or password information, acting as an access gateway and session manager, caching data (for example, for an electronic programming guide (EPG)), and transcoding and/or repurposing messages, such as errors, alerts, notices, and the like. Thus, in some instances, electronic program data is periodically obtained from an external source, such as 750, and such electronic program data is cached in wireless DVR interface block 742. That is, while EPG data may be cached at block 742, it may require periodic updates from block 750 via, for example, block 748 to access the latest programming data.

Turning now to authentication server block 748, this block can gather user information, such as a user name and password, and authenticate same, for example, by checking blocks 710 and/or 712, which may hold account information about account(s) of user 702. Billing system 710 may also have data on the type of customer premises equipment (CPE) associated with user 702. In some instances, the functionality just described is performed by identity management server 712, which may obtain needed information from billing system 710. User information may be authenticated via appropriate billing queries with block 710. Block 712 may contain master record storage of user login information, and may include single sign on (SSO) capability and digital identity creation and storage. Communication by block 748 with block 710 may be, for example, via XML Simple Object Access Protocol (SOAP), possibly through an intermediate block 746. Block 746 may provide, for example, single sign-on and/or cross-platform identification capability (for example, the user may have a mobile phone number, an account number with the CATV service provider, cable services authorizations, and the like). Block 746 may retrieve and translate any activity on a subscriber's account which may lead to actionable impact through block 748. For example, a user's service location may have changed, in which case a user now needs to retrieve a new channel line-up, or a customer is now in delinquent status with his or her account, in which case limited or no access may be allowed to the Remote DVR application. Similarly, communication between block 748 and block 712 can be, for example, via XML SOAP. A non-limiting example of a communication technique that can be used between the IP core 724 and wireless DVR interface layer 742 is XML over HTTP. Thus, in general terms, in response to a user's access request, a step of facilitating verification that the user of the DVR 158 and wireless device 704, 706, 708 is a valid user can be conducted.

The authentication server block 748 may, in one or more embodiments, include the functionality for allowing remote programming of the DVR 158 via PC 720, such as user authentication, subscription validation, personalized settings display, programming guide retrieval and display, and so on. Since the functionality of block (or layer) 742 is to tune the aforementioned functionality down for the mobile devices, in one or more embodiments, block 742 only needs to communicate with block 748 and the mobile devices. In one or more embodiments, block 748 provides to block 742 a set of application program interfaces (APIs) and feeds (intended for the PC domain) that are in a protocol such as XML. The format of the content in the XML feed that is sent from block 748 to block 744 will be known by block 744. Block 742 will then parse the feed and retune or repurpose it and send it to block(s) 722 and/or 736. In one or more embodiments, block 748 is substantially unchanged as compared to a solution that accommodates only remote control via PC 720 (and not via the mobile devices 704, 706, 708); however, some minimal modification may be needed to interface with block 742 and the mobile devices. This includes the repurposing and modification of the mobile guide (EPG) so as to be formatted in an acceptable manner for each specific device (i.e., limit the amount of EPG data being passed at a time). It also includes the transcoding of notifications and error messages to be sent down to the devices, so as to be considerate of the screen size.

Basic aspects of repurposing and transcoding can include addressing limitations in data size associated with the mobile device, and/or recreating (scaling) back end messages intended for a PC so that they can be more appropriately understood by a mobile device. For Internet communications, content (the raw message) is typically wrapped by protocols such as XML, Slash, and the like. Mobile devices typically do not have browsers that can handle such protocols and so the layer 742 advantageously unwraps the raw messages intended for a PC and re-wraps them in a form appropriate for the mobile client.

Block 748 may be implemented, for example, using an authentication server 758 and a database 760 accessible to the server 758. Block 748 may function as an authentication server and portal, and may perform one or more of authentication and identity management, gathering of set top box information (Media Access Control address (MAC address), Internet Protocol (IP) address, and the like), gathering user information (for example, via a web-based graphical user interface (GUI) accessible on PC 720), creating a digital identity, and so on. Block 748 can communicate with block 750, wherein electronic program guide (EPG) data is available, for example, via Internet 762. The EPG data may include metadata passed to database 760. In some instances, EPG information may be obtained from a third party business partner of the CATV operator, such as Tribune Media Services, as discussed above.

Block 752 can include an application server 764 and a web server 765. Blocks 748 and 752 together form one possible implementation of block 790. In one or more embodiments, each head end 105, as discussed above, may include functionality depicted in block 754, which interfaces with block 752. This functionality may be implemented, for example, on processors depicted in head end 105, or on other processors coupled to them, or some combination thereof. Block 752 is capable of communicating with the DVR set top boxes 158 (e.g., via block 754), and can make APIs into the set top boxes 158 available to block 748. It should be mentioned at this point that the various blocks or layers in FIG. 9 describe functionality that can be achieved using components shown therein, such as servers, databases, and the like, but the skilled artisan will appreciate that such functionality can be achieved in other ways, as well. Block 752 may thus be considered a "hook" into the physical paths into the set top boxes 158. Functionality in block 752 may include one or more of accessing division head end channel line-ups, accessing channel listing guide and navigation servers (for providing guide and navigation interface functionality to set-top boxes 158), and sending DVR control commands. Communication between block 748 and block 752 can be, for example, via the Web Services Description Language (WSDL) XML format, XML SOAP, and the like. XML WSDL may also be used between block 752 and block 754. Block 752 may thus pass authentication information to the appropriate application server, return head end channel listings, and send requests to set top box (DVR) 158. The XML WSDLs may retrieve EPG listings, enable DVR control commands, and extract set top box information.

Thus, a user 702 interacting with his or her DVR 158 via PC 720 will see a certain user interface, electronic program guide, a certain amount of data, and have the capability to scroll through and pick programs to record. On a mobile phone or other mobile devices 704, 706, 708, this functionality is advantageously converted, for example, via block 742, to function with the relatively small screen and limited memory of the mobile devices.

Block 754 preferably includes a video network portal 766 and a head end (HE) server 768. A number of servers 768 may be in head-ends of divisions of the CATV service provider, and may send individual program listings and channel line-ups to an aggregation server. Again, functionality in the head end may be implemented on processors depicted in head end 105 or on other processors coupled to them, or some combination thereof. Block 756 can include set top box (with DVR functionality) 158; appropriate control information is passed back to the various layers and servers to effectuate the remote control functionality described herein. In some instances, aggregation server functionality can be provided, for example, within block 764—such an aggregation server can pull together the program listings and channel line-ups from disparate locations such as the head ends.

In view of the discussion herein, it will be appreciated that an exemplary method for controlling at least one digital video recorder, according to one aspect of the invention, includes querying at least one server from a wireless device such as 704, 706, 708, to obtain program data and DVR data. The program data may reside on or be accessible to a server within block 750. The DVR data may reside on DVR 158. Another step may include receiving the program data from the server and the DVR data from the digital video recorder. Further steps may include displaying the program data and/or the DVR data on the wireless device, and controlling the at least one digital video recorder by selecting a user-operable function from the program data and/or the DVR data on the wireless device.

In another aspect, a method is provided for a cable television service provider to offer a consumer a service of controlling at least one digital video recorder owned and/or operated by the cable television service provider. Such method may include the cable television service provider carrying out or facilitating the steps described just above, for example, by interacting with a consumer's wireless device, using at least one server under control of the cable television service provider. Communications with the DVR(s) are preferably carried out over the cable televisions service provider's own cable television network, for example, network 140.

In still another aspect, a system for controlling at least one digital video recorder 158 with a wireless device such as 704, 706, 708, includes a DVR control module, for example, as formed by blocks 748, 752, 710, 712, and 750. Also included is a cable television network such as network 140, which may include blocks such as blocks 754 and 756. The network is coupled to the DVR control module and the at least one digital video recorder. The system also includes wireless DVR interface module 742, coupled to the DVR control module and configured to carry out functionality as described herein.

Exemplary functionality of system 900 will now be described. A mobile user 702 may view the latest channel listings downloaded via the EPG of block 750 to a mobile device such as 704, 706, 708. Mobile device 704 may have a mobile DVR control application. In some instances, the user 702 may advantageously select a future program to record with one-touch functionality (for example, appropriate defaults could be stored such that a record command could be executed substantially by a single action, such as a click or depressing a key). Examples of such defaults include: if the show should start/stop on time (or include a 1-15 minute delay), if the recording will be single or series, which DVR to record to, and how the recording should be saved (saved until space is needed or until user deletes recording). The mobile DVR control application (which may include an application in block 742 that interfaces with the mobile devices) passes the DVR control commands received from the mobile device to an application backend, where such DVR control commands may be translated to communicate with the authentication server 758. Note that the backend layers include blocks 752, 754, and 756. "Backend" may be employed, for example, to refer to the components to which commands are sent in order to complete the Remote DVR request.

The aforementioned application backend on block 742 interfaces with the authentication server 758, and the user 702 is authenticated and the billing systems are checked for current user information. Server 758 interfaces with, and passes mobile DVR control commands with, backend application servers in block 752. A mobile DVR control "record" command can be passed in this manner. The DVR control command is then sent to video network portal 766 and HE (head end) server 768 in the division head-ends of a CATV service provider. Portal 766 communicates with the DVR 158 through the server 768. Server 768 communicates with the DVR client and sends an appropriate DVR control command to cause recordation of the program selected by the user on the EPG listing. Communication with set-top box/DVR 158 may be via techniques as described above with respect to FIG. 1.

As noted, one or more embodiments may permit interface with a wireless network operated by a CATV provider or by a third party, or both. The system 900 may be described, in general terms, in the aforementioned layers:

User Layers: These include the PC portal layer 718, the CATV service-provider operated wireless network layer 722, and the third-party operated wireless network layer 736.

Mobile Client Backend Layer: Intermediate layer 742 between the mobile client application and Authentication Servers 758 in layer 748.

Front-end Authentication and Registration Layer: Initial user registration, continual user authentication, and interfaces with billing systems, per layer 748.

Backend API Layer: Communicates with STB/DVR, gathers (for example) Tribune EPG Metadata Head-end and Home Layer: Layer 754 includes servers located in division head-ends, and interfaces with Home STB/DVR layer 756.

Specific functionality of one or more non-limiting exemplary embodiments will now be described. The authentication server 758 will process user authentication factors, including username, password, and mobile directory number (MDN) (cellular telephone number). Furthermore, in some instances, server 758 performs various identity management functions such as retrieving account update information when a customer moves to a different location, becomes delinquent in account status, adds a new DVR to his or her service, etc. The logic associated with EPG listing expiration will reside within a cellular phone DVR Control application downloaded to mobile devices such as 704, 706, 708. The passing of usage parameters, such as EPG retrieval, DVR control commands, and the like, will follow the same protocols and logic of that of the PC DVR Control solution (that is, the functionality designed to interface directly with PC 720 without being "tuned down" for the mobile devices). Overall registration functionality for one or more embodiments of the wireless DVR control service can be integrated into a PC-based DVR registration solution. Backend validation factors for wireless DVR control can include, for example, the username and password as used with the PC DVR Control service, in addition to the MDN which is specific to the mobile phone or device. The username and password can be used to verify customer type and permissions. The wireless DVR interface block 742 will act as an access gateway and session manager to the authentication server 758. Wireless DVR interface block 742 will proxy the username and/or password, cache data (EPG), and format, transcode, and/or repurpose wireless messages or alerts.

One possible example of the aforementioned registration process will now be described. PC user 702 navigates to an appropriate online account registration page of the CATV service provider. The user enters required information, by way of example and not limitation, one or more of account number, last name, first name, state, division, and last four digits of social security number and/or driver's license number (of course, in compliance with any government regulations regarding the kind of information that can be obtained). "Division" may be thought of as a market location where the CATV system operates to deliver and support products from an operational perspective (i.e. customer care, marketing, sales). Authentication server 758 then authenticates user 702 as a valid subscriber and the user creates a new username and password for remote access to the online account. The user then re-logs-on to the portal of the CATV service provider, where a PC DVR control homepage is presented. It should be noted at this time that the aforementioned sequence assumes that the user has never set up his or her PC-based DVR control account. If such account had in fact already been set up, a link could be presented for wireless control sign up from the PC DVR control home page.

At this point, regardless of whether the user has previously registered for PC based DVR control, or has just registered for such control, the user can be prompted with an option to personalize the service (based on user's state, division, channel line-ups, DVR naming (in the case of multiple DVRs), and the like). If the user selects this personalization option, the application passes through IP core 724, through wireless DVR interface server 744, through to block 752, where personalized line-ups, etc, are stored. Following such personalization, a link can be presented at the PC DVR control page for wireless DVR control signup. When the user clicks such link, he or she will be presented with a new page with a list of steps needed to confirm wireless service and the type of wireless device to register for the remote DVR control service. Typical prompts could include entry of mobile phone number, entry of device manufacturer, and entry of device model. In one or more instances, with single-sign-on functionality, a user 702 who is already logged in over the Internet, as at 718, may simply click a single "Yes, set up my phone for DVR control" button. Authentication server 758 will then confirm the telephone number and device type. A Short Message Service (SMS) message is then sent to the user's mobile device, with a link included to download a DVR control client. Appropriate back-end intelligence may be included to ensure that the correct mobile client package is sent to the device, based on the parameters entered earlier during the just-described sign-up process.

In general terms, registration can include facilitating registration of a user 702 of the at least one digital video recorder 158 with a remote control service for the digital video recorder, and facilitating the user downloading a digital video recorder remote control application to the remote wireless device 704, 706, 708. During registration, the user might rename one or more DVRs to particular given names, which might be persistently stored. The registration could include allocation of a user name and password, and storage of the user name and password could be facilitated for ease in verifying that the user is valid (a so-called "remember me" option). Further, registration of additional users of the DVR(s) 158 in home 716 can be facilitated. The additional users may be associated with the same account as the first user, and may also download the application to their remote devices (slightly different versions might be needed for different mobile devices). In some instances, the same user name and password may be shared across all users corresponding to the same account (as in a family structure). In other instances, authentication logic may be built so that multiple users within an account can have their own authentication factors.

One possible example of the aforementioned authentication process will now be provided. User 702 launches the mobile DVR application that has been downloaded as just described, and enters the username and password. The mobile DVR control application sends the username and password back to the authentication server 758 for validation (through wireless DVR interface server 744). Server 758 first authenticates the user information with block 712 (which can include appropriate IDS/IDM identity management functionality). Preferably, the mobile DVR control application supports username and password storage to avoid the need to continually re-enter the credentials during each log-on session. Server 758 then queries the billing system 710 to ensure that the customer is active.

Once all the user information has been authenticated, server 758 sends an acknowledgement back to the mobile DVR control application. Database 760 then maps the subscriber head-end, and the server 764 is queried for information regarding set top box 158, such as the MAC address. Channel line-ups from the head end can also be queried and returned to the authentication server 758. The mobile application can determine the last EPG retrieval instance; if the time is more than 24 hours (or some other predetermined value), an updated version of the EPG will be obtained. Similar logic and processes can be employed to deliver EPG listings for both PC-based and mobile DVR control. The channel lineup can be retrieved from database 760 as needed, and database 760 can be queried to retrieve, for example, TMS 5.0 data, available from Tribune Media Services.

One or more embodiments of the invention thus will allow subscribers the ability to control their DVR-enabled Set Top Box (or set top box with separate associated DVR) to record their favorite TV programs from a remote location, including access via both PC and wireless platforms. Advantageously, the capabilities and features of the PC platform transcend across the wireless platform, with appropriate translation, via wireless DVR interface server 744. One or more embodiments of the remote DVR service advantageously offer consumers the ability to control their "time shifting" demands in a "place shifting" manner.

Many subscribers to CATV have multiple DVRs in their homes. Thus, the ability to deal with multiple DVRs remotely is preferably included in one or more inventive embodiments. In such cases, the modified representation of the menu includes an option to select between the at least one digital video recorder and at least a second digital video recorder, with an additional step of obtaining, from the remote wireless device, a representation of a selection of which DVR is desired. In some instances, responsive to the selection, a representation of a listing of selections already programmed on the selected digital video recorder is obtained from the back end, is translated into a modified representation for the mobile wireless device, and transmission to the remote wireless device is facilitated.

Further, one or more embodiments of the inventive cross-platform DVR control advantageously provide PC-based and wireless-based versions with similar "look and feel" to the in-home version running on the user's DVR 158, yet with a mobile context in mind. As noted, in one or more embodiments, the wireless version will leverage both its user registration and/or authentication logic and back-end integration with its counterpart PC-based remote DVR solution. One advantage of this approach is the enablement of the same functional experience across the PC and wireless platforms.

Advantageously, the wireless version of the remote DVR application will be configured as a stand-alone application operable with both wireless scenarios 722 and 736. The stand-alone application may be made available across a mix of mobile handsets, by way of example and not limitation, LG 550, Sanyo 6600 Katana, Samsung M510, Nokia N95, Nokia N800, Windows Mobile phone, and the like. In one or more embodiments, the wireless application can be developed under different platforms, such as, by way of example and not limitation, JAVA, Symbian, and Windows Mobile.

One or more embodiments may be configured to provide basic functionality, such as single program recording, preferences, EPG integration, and program guide search. More enhanced DVR functionality may also be provided, such as series recording, conflict resolution, and a DVR show list. Series recording can be in response to a command, from the remote wireless device, to record substantially all series episodes of a given television program (for example, for a given programming season). Conflict resolution can address conflicts between recording requests, and may involve offering appropriate guidance via the menu accessible to the user 702.

In one or more embodiments, a subscriber will have the ability to schedule a program recording from work using his/her PC, view and modify the previously initiated recording using his/her mobile phone while sitting in traffic, and once home, retrieve the recorded program and watch its content in the comfort of his/her home. The menu shown to the user may include a listing of selections already programmed on the home DVR(s) (a listing of selections may include information that no, one, or more selections are already programmed).

Additional exemplary details applicable to one or more embodiments of the invention will now be provided. The aforementioned remote DVR software applications should be available as a downloadable wireless client application, and be compatible with the various mobile handsets, DVRs, and so-on, which are present in the system. The user name and password should be user-selectable and, as noted, should be remembered in the handset application, so they only need to be entered upon initial setup. The application preferably supports 2-factor authentication (user name and password) for the mobile wireless handset (after the initial registration described above), ideally with user name and password storage on the handset (or other mobile device) in order to allow ease of use without requiring the user to enter 2-factor identification upon application launch. Advantageously, users may be prohibited from downloading the client to inappropriate handsets or other inappropriate mobile devices.

In one or more embodiments, the application is accessible through a menu of CATV operator-specific applications that is resident on the device, such as a CATV operator home page or portal. The application is preferably accessible through an icon on the home screen, and on the applications menu. The application may retrieve the most recent EPG data on, for example, a daily basis across all markets. In some instances, the application retrieves 72 hours of programming data for display on the EPG; however, 72 hours is a non-limiting example, and scaled-down data may be provided to mobile devices.

The application preferably supports a number of additional features, such as one or more of the following features discussed in this paragraph. One possible additional feature is the set up of default settings for 1-click recording. Another is user selection from more than one DVR, for accounts with multiple in-home DVRs. Yet another is user driven renaming of in-home DVRs for ease of use and logical DVR recognition. Still another is a central location for storage of renamed in-home DVRs, for DVR naming persistence across wireless and PC channels (persistent storage of logical renaming of in-home DVRs once applied by the user). A further additional feature is a timer on the handset (or other mobile device) in order to track the last time a user has launched his or her EPG data (this can be used to determine when a refresh of EPG data needs to be performed; in general terms, steps to be carried out can include monitoring, by the remote wireless device, of an amount of time since receipt of the electronic program listing, and, responsive to the monitoring, facilitating the remote wireless device obtaining a refresh of the electronic program listing). Still a further additional feature is the real-time retrieval of information stored on DVR 158 in block 756, preferably via direct communication over network 140 via blocks 752 and 754, to block 748; this may be used, for example, to resolve scheduling conflicts in real time.

Additional information will now be provided regarding exemplary authentication and registration processes. The wireless application typically follows the online account registration process as per the PC-based solution. In one exemplary embodiment, the following data elements are required for online account registration: Master Account#, Last Name, First Name (of master account holder), State, Division, Last 4 digits of SSN, or Driver's License number. Regardless of whether the subscriber is registering for access to the PC-based or wireless-based Remote DVR application, the account registration process is preferably only required once in order to validate the user as a valid CATV subscriber. One or more of the following features are preferably also provided by the online service registration process:

- allow a user to register as a wireless subscriber only
- support a way of initializing the wireless registration process
- allow a user to register as a wireless subscriber even after initially registering as a PC subscriber
- allow a user to register as a PC subscriber even after initially registering as a wireless subscriber
- allow a user to enter their 10 digit MDN (in some instances, we make the MDN required only if registering as either a Wireless Only or Both Wireless and PC subscriber)
- where required, validate that the user has entered a valid 10 digit MDN (valid can be defined, for example, by ensuring the MDN is numeric only, contains 10 digits, and does not begin in "0")
- validate a user entered MDN against the billing platform to confirm him/her as a wireless subscriber
- require a user to be a DVR and wireless subscriber when registering for the wireless Remote DVR product; deny a user access to the wireless Remote DVR application if he/she is not both a DVR and wireless subscriber.

One or more embodiments may implement one or more of the following post-registration requirements:

- point user towards online account management process for activities such as (but not limited to): Password reset, MDN change, Email address changes, Challenge questions
- support two-factor authentication for on-going Remote DVR validation (including, in one or more embodiments, User Name and Password)
- the user name, password must be the same as entered during the online account registration process (Note that throughout this patent application, language such as "must" is presented within the context of a specific embodiment, but in other instances, requirements referred to as "must" may be optional)

upon initial application launch, the application must require the user to enter his/her user name and password perform 2-factor authentication upon every application launch display each character or numeric value being entered in the Password field for 1 second after it has been input by the user allow "remember me" function where 2-factor identification is saved for automatic login support automatic login upon application launch if "remember me" function is turned on upon subsequent application launch, the user must be required to enter user name and password if "remember me" function has not been turned on (preferably allow user to opt out)

remote DVR application log-in should correspond to an approved mobile phone and should be mapped back to the account which was initially set up any attempt to log-in from a non-approved mobile phone using a valid User Id and Password should result in a failed log-in attempt multiple users associated to a single account should be allowed to access the Remote DVR applications from different approved mobile handsets under different approved user names and passwords once user has submitted user name and password, the application must validate the user is a valid CATV subscriber (a valid CATV subscriber may be defined as a user with an active CATV account)

once user has submitted user name and password, the application must validate the user is a valid DVR subscriber (a valid DVR subscriber may be defined as a user with at least one active in-home DVR)

once user has submitted user name and password, the application must validate that the user is a valid wireless subscriber (a valid wireless subscriber may be defined as a user with an active wireless account)

once user has submitted user name and password, the application must validate the user name and password against the user's online account profile once user has submitted user name and password, the application must validate the MDN against the MDN on the user's online account profile require the user to re-enter his/her user name and password in the event one or both of these factors have failed the validation process support unlimited login attempts support error messaging in the event of login failure within, for example, five (or other predetermined number of) login attempts after the 5th (or other predetermined number of) failed login attempts, the application must direct the user to the online account management site and/or the CATV customer care phone number, and prevent the user from accessing the application if the authentication process fails due to MDN validation, the application must support error notification back to the user indicating MDN validation failure and direct the user to the online account management site and/or the CATV customer care phone number.

Appropriate functionality may also be provided to prompt a user to agree to appropriate terms of service before access is granted. In terms of account information, the application preferably leverages existing operations support systems (OSS) for customer information, such as DVR, sub account structure, customer EPG, and the like. OSS are computer systems (back-end systems) used by telecommunications service providers and the like, to provide functionality such as, by way of example and not limitation, network management, fault and alarm monitoring, provisioning, activation, and so on. Further, the application may be configured to perform one or more of the following:

validate 2-factor sign-on validation against a customer's master account for both single and family account structures;

support different Remote DVR default settings from in-home DVR settings retrieve all set top box MAC addresses corresponding to a particular account retrieve the appropriate EPG associated with a customer's subscription package and home service location retrieve DVR service cancellation updates from the billing platform prevent a user from accessing the Remote DVR application if his/her in-home DVR service has been cancelled.

Further exemplary details will now be provided regarding the remote DVR user interface. The aforementioned application preferably supports a user interface, accessible through a standalone application, for mobile use, including proper resolution for optimal mobile screen usability. In order to interface with both PC and mobile wireless devices, the application must support a user interface that can be displayed in different resolutions based on device specifications. Preferably, the application supports an EPG's grid guide for the following:

to navigate across channels (vertical navigation)

to navigate across program scheduled times (horizontal navigation)

to navigate across programs for recording (horizontal navigation).

Thus, the menu seen by a user 702 can preferably be configured to facilitate both vertical and horizontal navigation. The EPG should include the channel number, brand icon, channel name, program name, program description, air date, air time, duration, rating, and all other available metadata. When a program is highlighted on the EPG, the application should display the program name, program time, and program description on the same screen as the EPG. When a program is selected, the application must display the program name, program date, program time, and program description on a separate screen. Preferably, the application has the ability to, at a minimum, display one full hour (two half hour increments) by four channels of TV programming of the EPG on a single screen regardless of the device being used to access the remote DVR application.

In one or more embodiments, the application retrieves the same information database as the in-home EPG, and the EPG displays the channels and services that are available on the home STB/DVR. The user interface may advantageously be integrated with a customer's individual channel line-up, defined by the Service Zip Code. The user interface should be integrated with the DVR access controls available through the server platform 768. The application should support scheduling of recordings through a one-click soft key button residing on the device, so as to initiate a recording using default settings (although in other embodiments, recording may require multiple clicks). When initiating a recording using the one-click soft key button, the application should schedule a recording according to the default setting parameters.

Still considering the remote DVR user interface, the application preferably enables another soft key button as an "Options" function, with the following selectable options: 1. Search, 2. Settings, 3. Back, 4. Exit. The application preferably supports the Search function which directs the user to a search screen. When on the search screen, the application should allow a user to select from a subset of search parameters for refined searches, and should allow a user to enter a key word search criteria. Once a search is initiated, the application should display the search results on the same search screen. Alternatively, the application may support two hard keys to function as Page Up and Page Down. Search of a program listing could include, for example, a genre search, a date-time search, a text search, and/or a channel search. The menu seen by user 702 is preferably configured for at least one of alphabetical and chronological display of results of the search. Search functionality may be prominently displayed upon application launch, and may be optimized by allowing "shorthand" identifications of any of the terms to be searched on. Speech-to-text and text-to-speech functionality may be employed, to allow search parameter (or other) input via speech, with results (or other system responses) read out by speech synthesis.

The application preferably supports the Settings function which directs the user to a settings screen, and should display preference options on a separate screen. Examples of preference options include: Recording Frequency, Save Until, Start Recording, Stop Recording. The application should display changes to an individual preference option on a separate screen, and should allow the user to save the selected Setting preferences as the default settings for all future recordings.

The Back selection should be visible and active when the user is in the Options menu. This selection should serve to close out of the Options menu when pressed and return the user to the EPG screen. The Exit selection should function as a means to exit from the application. When selected, it should result in closing out of the application. The Back button physically located on the device should result in returning the user to the previously selected function.

The application should provide the option to navigate horizontally across program listings by using right and left soft keys in order to navigate across programs and program times. When navigating horizontally, the application must not allow a user to navigate to a program time prior to the current time. The application should provide the option to navigate vertically across program listings using one of the following methods:
  using up and down soft keys in order to navigate across programs and channels
  using page up and page down hard keys in order to navigate across blocks of channels, where a "block" is identified as a complete handset screen view.

When navigating vertically, the application should allow continual looping of the complete list of channels/programs once a user has scrolled beyond the last channel/program available on the EPG. The application should support quick channel navigation by entering channel numbers using the mobile handset's number pad. The application can display a separate view which lists all available Set Top Boxes, if a user has more than one Set Top Box available with in-home DVR. capability. This should only appear for users who have multiple STBs with DVR capability set up under their account. If a user has multiple in-home DVRs, the application should allow a user to select one of the DVRs associated to the account as the default DVR for scheduling recordings remotely. The application can allow the end user to select one or multiple STB/DVRs to record a specified program, and should support renaming of STB/DVRs driven by the end user.

The STB/DVR renaming option should be prompted upon initial application launch, and an already active PC-based Remote DVR user should be able to retrieve the STB/DVR previously renamed through their wireless application. The application should allow the renamed STB/DVR to be retrieved from a centralized location for use on the handset. Upon subsequent recordings, the application should retrieve and display user preferred STB/DVR name, and upon subsequent recordings scheduled through the application, user should no longer be prompted to rename the STB/DVR. The application should support the ability to rename an STB under a preference option, to be initiated by the user at any time, should display a confirmation message in a separate view for the renaming of an STB/DVR, and should allow a user to navigate out of the confirmation notification for recording.

Further exemplary details will now be provided regarding recording functionality. The application must be able to process a recording request real-time, and to record a program up to a predetermined amount of time, such as 72 hours, ahead of the current date. The application should support recording parameters to be saved on one or more DVRs, and should support multiple DVR recording. For households with multiple DVRs, users must have the ability to select one of many DVRs when scheduling a recording request. The application must support applying the same DVR settings across all DVRs accessed remotely from a single account.

The application must allow a user to select his/her Recording Frequency setting, from the following options: single, series. Further, the application must allow the user to set/change the Save Until setting to any of the following preferences: space is needed, I delete. The application must allow the user to set and/or change the Start Recording setting to, for example, any of the following preferences: On time, 1 minute early, 2 minutes early, 3 minutes early, 4 minutes early, 5 minutes early, 15 minutes early, 30 minutes early, 1 minute late, 2 minutes late, 3 minutes late, 4 minutes late, 5 minutes late, 15 minutes late. Yet further, the application must allow the user to set and/or change the Stop Recording setting to any of the following preferences: On time, 1 minute earlier, 2 minutes earlier, 3 minutes earlier, 4 minutes earlier, 5 minutes earlier, 15 minutes earlier, 30 minutes earlier, 1 minute late, 2 minutes late, 3 minutes late, 4 minutes late, 5 minutes late, 15 minutes late, 1 hour late, 2 hours late.

Preferably, the application displays a visual indicator on the EPG that a recording is scheduled. This should typically only apply for program(s) which have only been scheduled remotely (PC or wireless). The application must be able to schedule a recording for a single program based on the user's program selection on the EPG, and must also be able to schedule a recording for a series program based on the user's program selection on the EPG. The application preferably allows a user to initiate a recording request through a one-click option on the grid guide. The application preferably allows a user to initiate a recording request from a separate screen where the program name, program description, start time, and program duration are displayed.

In one or more embodiments, the application must allow a user to initiate a recording request anytime prior the program's end time, and must prevent a user from initiating a recording request that has a program start time earlier than the current time. The application should support a single recording set up parameter.

In another aspect, recording confirmation capability is provided. Thus, the application should send a confirmation of a scheduled recording immediately following a user's selection to record a program, and the application should notify a user if a recording request could not be fulfilled. Further, the application should provide the end user with an optional confirmation that the recording has been successfully scheduled via a text message, SMS, or multimedia messaging service (MMS) to a wireless device, after inputting a 10 digit cellular telephone number and wireless carrier. Such an indication is preferably optional for the user to receive.

In one or more embodiments, conflict management capability may be provided.

Further details will now be provided regarding electronic program integration and search capabilities. Preferably, the EPG for the remote control application uses the same information database as the STB 158. The EPG that is retrieved should be specific to an individual subscriber's channel line-up, should provide channel name and number, show name, air date, air time, duration, rating, and all other available metadata. The application should allow the EPG to display a recording indicator on any programs which were already set to "record." This includes programs which were set to record either at home or through an end user's PC. The application must support searches by program title (all metadata), by channel name (all metadata), and by theme (all metadata). The application should support one or more of the following theme selections: News & Weather, Sports, Kids, HDTV, and the like.

Further, the application should support filters/searches by Date and Time for ease of navigation, and should require both Date and Time filter parameters when on the Search screen. In one or more embodiments, the ability to display Date parameters which fall only within 72 hours (or some other appropriate period) of the current date and time is supported. The application should display search results on a separate screen similar to the search results display view at home, and at a minimum, the application should display the following information on the search results view: Program Title, Start Time. In some instances, the application supports user search results to set up single recording, and the search results screen may include a one-click soft key button to initiate recording.

In one or more embodiments, applications accessed by PC or by wireless devices may have a similar look and feel. Advantageously, the same server(s) can be used for both the Internet-based solution 718 and the wireless solutions 722, 736, but different clients may be employed.

In another aspect, a method for controlling at least one digital video recorder includes the steps of querying at least one server from a wireless device 704, 706, 708 to obtain a DVR identifier and DVR control preference information, receiving the DVR identifier and DVR control preference information from the server, displaying the DVR identifier on the wireless device, and controlling the at least one digital video recorder 158 based on the DVR control preference information by selecting the DVR identifier displayed on the wireless device. The DVR identifier can be, for example, a MAC address, a personalized label, and/or a graphical representation. The DVR control preference information can include, for example, one or more of default setting storage requirements; color information; recording parameters; conflict resolution parameters; parental control settings; reminder information; alert information; and the like.

A number of exemplary, non-limiting use cases will now be set forth, to illustrate how one or more embodiments of the invention may be advantageously employed. Initially, some definitions will be presented:
1. DVR Show List—This is a listing of all existing program recordings which are being stored on a user's set top box.
2. STB—Set Top Box; this is the physical hardware device where all television content is passed through and/or stored.
3. DVR—Digital Video Recorder; this is the device which records video in a digital format (may be integrated with STB).
4. MAC Address—This is the STB/DVR identification number which is associated to a user's billing account.
5. EPG—Electronic Program Guide; this is the grid guide which enables users to navigate through their TV listings.

Use Case A: Initial Online Registration of Remote DVR Service:

DVR and Wireless subscriber (Joe) has one DVR in his home. Joe has broadband access to the Internet from his PC at work.
1. Joe goes to his office and logs onto the CATV provider's online account registration uniform resource locator (URL). This is the first time Joe logs onto this site.
2. Under the log-in section, Joe selects New User and is navigated to the CATV provider's online account registration page.
3. Joe enters all required information, including his Account number, Last Name, First Name, State, Division, and Last 4 Digits of his SSN or Driver's License.
4. The system authenticates Joe as a valid CATV subscriber and requires Joe to create his User Name and Password for remote access to his online account.
5. The system confirms Joe's newly created User Name and Password.
6. Once the system has validated Joe as a CATV subscriber, Joes logs into the CATV provider's portal using his new user name and password.
7. Joe is presented with a link to the Remote DVR homepage where he is given a channel line-up option to select from based on his already identified State and Division location.
8. Joe selects the appropriate channel line-up.
9. Joe is now given the option to rename his in-home DVRs. Based on the instructions provided to Joe, he overwrites the MAC Address (representing a DVR) with the logical name 'Home DVR' and clicks submit.
10. Joe now links into the Wireless DVR sign-up page where he is requested to enter his MDN, device manufacturer, and device model and clicks submit (drop down).
11. Once validated as a wireless user, Joe is then provided with a link where he can have his Remote DVR application sent to him.
12. Joe receives an SMS on his mobile device which contains the link to download the Remote DVR application.
13. After selecting to download the application, Joe sees a completion status bar which lets him know how far along the download process the application is in.
14. Once the download is complete, Joe is able to directly access his Remote DVR application to begin recording programs from a variety of geographical locations (basically, wherever a wireless connection is available) at substantially all times.

Comments to Use Case A:
1. Step 3—There may be changes to the information a user is required to enter when registering for their online identity. The requirement, however, remains the same in that the Remote DVR application will typically support 2-factor authentication.
2. Step 4—The amount of data displayed from the DVR Show list will be dependent on the device and the performance impact to the end user.
3. Step 9—Upon Remote DVR registration, all DVRs associated to an account will typically be displayed by their MAC Address only.
4. Steps 11-14—Preferably, a "Theme" update will support the DVR button for one-click access and download capabilities. Theme in this context refers to what is used to describe the mobile screen—the screen you see when your cell phone is on. Theme is similar to a "wallpaper" but it has functions built into it such as buttons for one touch access to highly used applications. For example, the cellular phone "Theme" may include a one touch access to the Remote DVR application.

Use Case B: First Time Logging into the Remote DVR Application Using a Mobile Phone CATV DVR and Wireless subscriber (Nancy) has a multiple DVRs in her home.
1. Nancy launches the Remote DVR application using her approved mobile phone
2. Nancy is prompted to enter the User Name and Password which she created during her online account registration process. Nancy enters this information, selects the Remember Me option for future use, and clicks the Enter or OK button.

User Enters the Wrong User Name and/or Password
a. Here we consider the event that Nancy enters the wrong password and/or user name.
b. A message should appear on the screen notifying her that she has entered an invalid name and/or password and allow her to try her authentication entry again.
c. After the 5th failed attempt (or other pre-determined number), Nancy is directed to an appropriate web site for password reset.

User Does Not Have a Valid Account (No Longer a DVR Subscriber)
d. Here we consider the event that Nancy has cancelled her DVR service, yet attempts to enter a valid user name and password.
e. A message should appear notifying her that she no longer has access to the application.
f. Various appropriate actions may then be taken; for example, she may then be directed to the Remote DVR registration site for validation of her account.)
3. The system validates her as a CATV and wireless subscriber. An optional Remote DVR Introduction video is launched to demonstrate to Nancy how the many functions available through this application work
4. The end of the video leads Nancy to the Electronic Program Guide (EPG) screen. Upon completion of the video, Nancy decides to review her Remote DVR Settings since she is able to update them specific to her needs.
5. From the Options soft key, Nancy selects the Settings option.
6. Her setting options include: 1. DVR Naming, 2. 1-click Recording. Nancy selects the DVR Naming setting.
7. Nancy is given a list of MAC addresses to select from, each representing a different DVR she owns at home. Nancy selects one of the listed options and her DVR Show List is popped up.
8. Once Nancy has reviewed the selected DVR Show List, she is able to determine the DVR which it corresponds to.
9. She navigates back to the DVR Naming option and enters "Living Room DVR" as the new name for her corresponding DVR.
10. She follows the same DVR Naming process for all remaining DVRs.
11. Nancy now selects the Default DVR settings option.
12. She is given a list of DVRs to select from. She selects "Living Room DVR" as her default option.
13. From the EPG screen, she can see all of her TV listings with data from ranging from the current time to up to 72 hours (or some other predetermined amount) into the future.
14. Nancy navigates to today's 10 PM time slot and selects a program for future recording.
15. Nancy sets up her Recording Parameters to Start Recording 5 minutes early and Stop Recording 5 minutes late for this recording, and clicks the OK button.
16. After choosing which DVR(s) to program, Nancy gets the following menu choices related to the show she has chosen:
   g. Record this episode only
   h. Record the series
17. She selects the "Record this episode only" option.
18. Nancy is then presented with the 'Save Until' parameter where she has the following options to select from:
   i. Space is Needed
   j. I Delete
19. Nancy selects the default option, the "Space is needed" option.
20. Nancy receives a confirmation notice on screen which notifies her that the program she selected has been successfully scheduled to record.
21. Soon after, Nancy sees a visual recording indicator on the program's cell.

Comments to Use Case B:
1. Step 7—This assumes Nancy had opted not to rename any of her DVRs online during the Remote DVR registration process.
2. Step 13—The amount of EPG data displayed on the application will, in one or more embodiments, be dependent on the device and the performance impact to the end user.

Use Case C: Updating Remote DVR Settings and Preferences Using a PC and Mobile Phone DVR and Wireless subscriber (Bob) just signed up for a new DVR box and now has multiple DVRs in his home. Bob has already registered for remote DVR access. This is the first time Bob is accessing his DVR. He has broadband access to the Internet from his PC at work.
1. Bob logs into the CATV provider's online 'Remote DVR' site. He enters his user name and password and clicks Enter.
2. Bob is successfully logged into the Remote DVR site. He navigates to his Settings options and selects 'DVR Renaming'.
3. He is presented with a list of all DVRs currently available under his account. One has already been renamed 'Living Room DVR' and the other one is displayed by the MAC address associated with his STB/DVR.

4. Bob selects the DVR option with the MAC address and he is presented with the DVR Show List for this DVR. The DVR Show List is empty.
5. He enters a new name for this DVR. He types in 'Bedroom DVR' and clicks submit.
6. He now navigates to a one-click recording option within the Settings menu.
7. Bob selects the Living Room DVR as his default DVR. He can now select a recording with one click from his PC or mobile phone and the program will automatically default to his Living Room DVR for recording.
8. Later in the day, Bob launches his Remote DVR application using his mobile phone.
9. Bob is automatically signed in since he previously selected a "Remember Me" option
10. Bob selects the Settings option and selects 'DVR Renaming'.
11. Bob's updates originating from his PC are reflected on his mobile phone. He now sees two DVR selections: 'Living Room DVR' and 'Bedroom DVR'.
12. He overwrites the 'Bedroom DVR' with 'Kid's Room DVR,' then clicks submit.
13. Bob returns to his TV listings (EPG) and navigates to his favorite program 'Local News' beginning at 7:00 PM.
14. He clicks on Record using his soft key.
15. The 1-click recording will automatically schedule a recording for the requested program, using the following default parameters:
   a. Start: on time, Stop: on time
   b. Recording Frequency: single recording
   c. Save Until: Space is Needed
16. (Since Bob has selected a default DVR, when he selects "Record," the program will automatically schedule his recording to that default DVR.)
17. Soon after, Bob sees a visual recording indicator on the program's cell. A program cell is the equivalent of a program unit. For example, the show "Tennis Today" may be on channel 4 with a time of 7:00 PM-7:30 PM; the manner in which this program appears on the guide is the program cell.

Comments to Use Case C.—Step 15-16: Preferably, a true 1-click recording option is available, where all recording parameters are defaulted.

Use Case D: Multiple DVR Actions Performed at the Same Time

DVR and wireless subscriber Sue and her son Dave have registered for the Remote DVR service for use on their respective mobile phones and PCs. There are two DVRs under this single account. Neither of these DVRs has been renamed. Both have broadband access to the Internet from their PCs at work and/or home.
1. Sue launches the Remote DVR application using her mobile phone. She is automatically validated as a user, since she has previously selected the Remember Me function.
2. Dave signs into the Remote DVR site using his PC. He enters his user name and password (same as mother's user name and password) and is validated as a user.
3. Sue selects the DVR Settings→DVR Renaming option. Dave does the same from his PC.
4. Sue is given a list of MAC addresses to select from, each representing a different DVR she and her son own at home. Sue selects the first listed options and her DVR Show List is popped up.
5. Once Sue has reviewed the selected DVR Show List, she is able to determine the DVR which it corresponds to.
6. Sue renames the first option 'Living Room DVR.'
7. At the same time, on his PC, Dave is given a list of MAC addresses. He selects the second option and the DVR Show List is retrieved.
8. After reviewing the DVR Show List, Dave recognizes this is his room's DVR and renames this second option 'Dave Room DVR.'
9. Both Sue and Dave submit their DVR naming updates at the same time.
10. Both updates are saved successfully.
11. Sue exits out of the DVR Renaming setting and navigates to her TV listings.
12. Sue navigates through her program guide to find the show 'Flower and Garden News' starting at 8:00 PM.
13. She selects the Record option using her soft key.
14. She is given a list of DVRs to select from. Both DVR naming updates initiated by Sue and Dave now appear in this list as 'Living Room DVR' and 'Dave Room DVR.'
15. Sue selects the Living Room DVR for the recording of this program.
16. Sue selects the default options associated with her recording parameters, which means that her program will begin recording at 8:00 PM and end at 9:00 PM. This will be a single recording.
17. Dave decides to record 'Basketball Today' at 9:00 PM and also decides to start his recording 5 minutes early and Stop 5 minutes late.
18. Dave schedules this as a series recording.
19. Soon after both Sue and Dave have completed their recording selections, they notice a visual recording indicator for both programs, 'Flower and Garden News' and 'Basketball Today'.

Comments on Use Case D: In some instances, multiple users may not be allowed to access the Remote DVR application at the same time using the same user name and password.

Use Case E: Recording a TV Program with Errors

DVR and wireless subscriber Amy has registered for the Remote DVR service for use on her mobile phone. There is one DVR under this account. Amy is accessing her DVR application while on a train.
1. Amy launches her Remote DVR application from her mobile phone.
2. She is automatically authenticated as a valid user due to the "Remember Me" function she had selected during her initial log in.
3. Amy is presented with her TV listings (EPG). She navigates to Acme News Network, channel 201 at 9:00 PM for a recording of the show 'Formula One Driver'.
4. She selects the program cell and is taken to the description view of this program.
5. Amy is able to see the entire program description, program start time, and end time.
6. From the description view, she realizes this is a new episode and as a result, selects the "Record" option using her soft key.
7. (Since Amy has only one DVR, this is automatically defaulted as her preferred DVR and she is able to skip the DVR selection process.)
8. She selects the default recording parameters, which means that her program will begin recording at 9:00 PM and end at 10:00 PM. This will be a single recording. She will save her recording until space is needed.

9. Once her recording for 'Formula One Driver' has been scheduled, Amy navigates to Beta Broadcasting Corporation, channel 04 at 9:00 PM for a recording of 'Health and Beauty Secrets of the Stars.'
10. This time Amy does not need to see the entire program description and selects the Record option using her soft key.
11. Amy once again selects the default recording parameters, which means that her program will begin recording at 9:00 PM and end at 9:30 PM. This will be a single recording. She will save her recording until space is needed.
12. As her application processes her recording request, the train passes by an area with low wireless signal. As a result, an error message appears and Amy is forced to exit out of the application.
13. Since the train is now in an area with greater wireless signal strength, Amy logs back into her Remote DVR application and navigates to the same 'Health and Beauty Secrets of the Stars' program on channel 04.
14. She performs steps 10-11 once again.
15. Amy now receives an error message indicating that her program was not able to get scheduled for recording.
16. Amy navigates vertically across her guide on the 9:00 PM time slot and notices that there are two other programs she scheduled to record from home which conflict with her 'Health and Beauty Secrets of the Stars.' request.
17. Amy navigates to her DVR Settings→Manage option and selects her only DVR.
18. She is able to view the program she was previously able to successfully schedule to record, 'Formula One Driver' and selects the Cancel option.
19. Amy now navigates back to her program guide and attempts to once again record 'Health and Beauty Secrets of the Stars.'
20. She performs steps 10-11. Moments later, Amy sees the visual recording indicator appear on the 'Health and Beauty Secrets of the Stars' program cell.

Comments on Use Case E:

Step 12: This type of error message is preferably provided by the Remote DVR application described herein, in cases when there is a weak or non-existent wireless signal.

Step 15: Various types of error messages can be supported in different embodiments. For example, tuner conflict errors may be supported; however, capacity limit errors may not be supported (or vice versa, or both may be supported).

Step 15: This action preferably does not force the user to exit the application.

Step 16: A user is preferably able to view not only the recordings initiated remotely from his or her PC and/or mobile phone, but all the recordings initiated from home.

Step 17: The Cancel option may be displayed or accessed from the mobile app via a variety of techniques. One technique would be to display it as a button somewhere at the bottom of the program guide screen when a program which has been set to record has been highlighted. Another technique would be to give a user the ability to cancel a program already set to record through a separate screen (e.g., a Program Description screen).

Use Case F: Subsequent Launch of Remote DVR Service

Nancy is a valid CATV subscriber who has forgotten her password for the Remote DVR Control application, and has requested a password reset online.

1. Nancy launches the Remote DVR application using her mobile device.
2. Nancy is prompted to enter the user name and password which she created during her initial online account registration process. Nancy enters this information. She leaves the Remember Me option unchecked, and clicks the OK button on her Remote DVR application.
3. The system will attempt to validate her as a CATV and wireless subscriber. The system returns an error message to the Remote DVR application detailing that her entered password is incorrect. A notification is shown to Nancy within the application explaining her entered password is incorrect.
4. After 5 (for example) unsuccessful attempts at entering her password, the system prompts and directs Nancy to visit an online account management URL in an application notification, where she can reset her password. In addition to the online account management URL, she is given a TWC customer care phone number she can call for over-the-phone trouble resolution.
5. The application will be "locked" after 5 (for example) unsuccessful login attempts, meaning Nancy will not be able to enter her username and password.
6. Nancy accesses the Remote DVR application provided URL on her PC.
7. The Password Reset homepage is displayed. On the page, a text boxes are shown for Nancy to enter required information for resetting her password.
8. Required information to be completed by Nancy in the text boxes include: Remote DVR Control User Name, Last 4 Digits of her social security number (SSN), and account number.
9. Once the above required information is submitted to the system, it is validated. If all information is valid, a subsequent page will be displayed prompting Nancy to enter her new desired password.
10. Nancy is required to enter the new desired password twice. It will be manually entered twice in two separate text box fields.
11. Nancy clicks submit. The system validates that the password Nancy entered in both text boxes match. If they match, a success notification is shown, and her new password is stored by the Identity Management System. If entered passwords do not match, she is prompted to re-enter passwords.
12. Nancy re-launches the Remote DVR control application on her handset. She enters her username and new password.
13. System validates new password entered in the mobile application. Login is successful.

Use Case G: Subsequent Launch: User Preferences

Tom will be able to set, store, and change user preferences on both the mobile handset DVR Control application, and on the PC DVR Control portal. In addition, Tom will be able to override preferences originally stored on the PC while using the handset application, or vice-versa. In this case, Tom would like to override a preference storing a recording start time, and personalize the name of a DVR box stored in his room.

1. Tom launches the Remote DVR Control application using his mobile device (Handset 2).
2. Tom is prompted to enter the User Name and Password which he created during his online account registration process. Tom enters this information, selects the Remember Me option for future use, and clicks the Enter or OK button.
3. The system validates him as a CATV and wireless subscriber.

4. Tom is presented with the initial Remote DVR Control EPG on his Handset, which includes a menu option for "Preferences". Tom navigates to the Preference menu option and clicks OK.
5. Tom is presented with a new separate screen displaying his preference options. His recording preference options include: Recording Frequency, Save Until, Start Recording, and Stop Recording. He notices the Start recording options are as follows: Start recording on time, 1 minute early, 2 minutes early, 3 minutes early, 4 minutes early, 5 minutes early, 15 minutes early, 30 minutes early (In general terms, the start time and/or end time for recording is specified as a margin from a nominal time slot of the television program).
6. Tom then navigates back to his home guide (i.e. EPG) and selects the TV series "This Week in Ice Hockey." After selecting the title of this program's cell, Tom is presented the current preferences for recording, all which were first stored on the PC.
7. Since the next episode of the "This Week in Ice Hockey" series is the series finale and includes a pre-show special which includes a season retrospective, Tom wishes to start the recording early this week. The following options will be presented: Start recording on time, 1 minute early, 2 minutes early, 3 minutes early, 4 minutes early, 5 minutes early, 15 minutes early, 30 minutes early.
8. Tom selects "record 30 minutes early".
9. By selecting the earlier recording selection preference, Tom overrides the recording frequency preference originally stored on the PC. A confirmation message is shown to Tom.
10. After overriding recording functionality, Tom also decides to override a DVR name that was originally assigned on the PC during initial registration by his mom, Nancy.
11. From the original Preferences home screen, Tom selects "DVR Settings".
12. Once selected, Tom is presented with a new screen showing the home's DVRs. Currently, there are two DVRs in the house which have been re-named "DVR 1" and "DVR 2".
13. Tom knows DVR 2 is the DVR box stored in his room. He selects this listing and is presented with an option to rename the DVR. Using his mobile handset keypad, Tom enters "Tom's DVR" and presses OK.
14. The DVR name change is accepted. The DVR which was renamed during initial account registration on the PC has now been overridden and updated on the mobile handset. The new DVR name will now be reflected both on Tom's mobile phone and PC.

Use Case H: Subsequent Launch: Recording Functionality Error

In one or more embodiments, the DVR Control system will allow series recording functionality; however a scheduled series recording which conflicts with a previously set series recording (set on PC) will result in a recording functionality error displayed to the user.
1. Tom launches the Remote DVR Control application using his mobile device (Handset 2).
2. Tom is prompted to enter the User Name and Password which he created during his online account registration process. Tom enters this information, selects the Remember Me option for future use, and clicks the Enter or OK button.
3. The system validates him as a CATV and wireless subscriber.
4. Tom selects the Options→Menu button and selects the Home TV Listings option.
5. From Home TV listings page, Tom can see a CATV localized grid guide with data from current listings to up to 72 hours (for example) into the future.
6. Tom selects a future series to record. He selects "Space Travel 3001" for a series recording, recording daily M-F starting at 10 pm.
7. The system validates the series recording. In this instance, during the 10 pm timeslot, there are 2 other series scheduled for recording—local nightly news and a travel program.
8. The previously scheduled series recordings—local nightly news and the travel program—were set using the Home PC DVR Control service. The request just made by Tom to record the "Space Travel 3001" series on his handset will result in a recording functionality error.
9. The system recognizes the conflict and a notification message is displayed.

Comments on Use Case H: Steps 8-9: In some instances, tuner conflict errors may be supported; however, capacity limit errors may not be supported (or vice versa, or both may be supported).

Use Case I: Subsequent Launch: Recording Functionality Error

The DVR Control system will allow up to two simultaneous recordings. However, there will be instances where a user will attempt to record a third recording unknowingly. In this scenario, a failed recording request will result in an error message displayed to the user. Tom will attempt to set a program recording in addition to 2 previous set recordings—with all 3 programs occurring or having overlapping time slots.
1. Tom launches the Remote DVR Control application using his mobile device (Handset 2).
2. Tom is prompted to enter the User Name and Password which he created during his online account registration process. Tom enters this information, selects the Remember Me option for future use, and clicks the Enter or OK button.
3. The system validates him as a CATV and wireless subscriber.
4. Tom is presented with his home guide. Tom can see a CATV localized grid guide with data from current listings to up to 72 hours into the future.
5. Tom selects a future movie to record. He selects "Planet Trek IV" showing at 8 PM on Acme Movie Channel, and selects the one-click record option.
6. The system validates the recording. In this instance, during the 8 PM timeslot, there are 2 other programs already scheduled to be recorded—National news and Baseball.
7. The 2 other simultaneous recordings (National news & Baseball were previously set using PC DVR Control). Since this creates a timeslot and simultaneous recording conflict, an error message will be returned to Tom on his mobile handset.
8. After Tom selects the record option for "Planet Trek IV," the system returns an error message detailing that there are already two other simultaneous recordings set during the 8 PM timeslot. Tom is unable to record the third program.

Comments on Use Case I: Step 10: Various types of error messages can be supported in different embodiments. For example, tuner conflict errors may be supported in some embodiments, while capacity limit errors may not be supported, or vice versa, or both may be supported.

Use Case J: User Searches for a Program to Record

CATV DVR and wireless subscriber Rich has already registered for the Remote DVR service for use on his mobile phone.
1. Rich launches the Remote DVR Control application using his mobile device.
2. Rich is automatically logged into the application since he has previously selected the Remember Me function.
3. Upon application launch, Rich is taken directly to his home guide (for example, EPG).
4. Using his soft key, he selects the Search option and is taken to a Mobile Search view.
5. Rich is given the option to search by Genre, Date/Time, or user entered text search.
6. Rich begins his search using the Genre and Date/Time options. He selects Sports as the Genre and 6/26, 7:00 PM as the Date/Time. He then selects Enter to conduct his search using the parameters he has entered.
7. All relevant search results are displayed in alphabetical and in chronological order of date/time. Rich navigates down this list and selects the baseball game he was looking for.
8. By clicking on the baseball listing from his search result, Rich is taken to the Program Description view where he's able to read a description of this game, the date and time of the game, and the program name.
9. Rich decides to select the Record option from here and he is taken to a series of parameter options where he selects the following:
   a. Start Recording: on time
   b. Stop Recording: 30 minutes late
   c. Recording Frequency: single
   d. Save Until: space is needed
10. Rich is then taken to his home guide on the channel number and time slot of the baseball game he has just set to record. He enters channel number 4 and is taken directly to this channel on his guide.
11. He navigates horizontally across the guide to find his favorite show "Southern Exposure."
12. Since he can't seem to find the time slot this program is scheduled to start, Rich decides to conduct another search so he navigates once again to the Mobile Search view
13. This time he decides to enter a text based search. Rich enters "Southern Exposure" then clicks Enter.
14. The search results, while varied, are displayed in alphabetical and chronological order. This set of search results include channel number 30, and programs beginning with the number "30."
15. Since "Southern Exposure" is two days from today, Rich is able to find this program within the search results and selects it.
16. He is now taken to the Description view and selects the Record option. Rich selects all default recording parameters for this show. This includes:
   a. Start Recording: on time
   b. Stop Recording: on time
   c. Recording Frequency: single
   d. Save Until: space is needed
17. Moments later, Rich is able to see a visual indicator on the program cell for "Southern Exposure" and the baseball game.

Comments on Use Case J—Step 14: The text based search can, for example, be restricted to program name, program description, and channel name (and assume that all channel number searches would be conducted via a channel jump option on the EPG), or may also include the channel number as a search parameter.

Use Case K: Additional Handset Downloads of Remote DVR

CATV DVR and Wireless subscriber (Joe) has one DVR in his home and two wireless lines associated with his account, one for himself and one for his wife Natalie. Joe has already registered online for his Remote DVR account. Joe has broadband access to the Internet from his PC at work.
1. Joe goes to his office and logs onto the Remote DVR registration site using his user name and password.
2. Joe is validated as a CATV Remote DVR subscriber and is taken to his Remote DVR account homepage.
3. Joe navigates to his Account Management options.
4. From here, Joe selects the Wireless Application Request option.
5. Joe is now taken to the Wireless DVR sign-up page where he's requested to enter his MDN, device manufacturer, and device model and clicks submit (drop down).
6. Joe enters the information belonging to his wife Natalie's mobile phone.
7. Joe is then provided with a link where he can have his Remote DVR application sent to her mobile phone.
8. Nathalie receives an SMS on her mobile device which contains the link to download the Remote DVR application.
9. After selecting to download the application, Natalie sees a completion status bar which lets her know how far along the download process the application is.
10. Once the download is complete, Natalie is able to directly access her Remote DVR application to begin recording programs from anywhere there is wireless service available, at substantially any time.

Use Case L: Simple "One-Way" Setup to Record a Program from the Office

Video/DVR subscriber (Joe) has one DVR in his home. Joe has broadband access to the Internet from his PC at work.
1. Joe goes to the office and logs onto the appropriate web site.
2. Joe logs in to his personal account.
3. From the website, Joe clicks a button for TV listings.
4. From the TV listings page, Joe can see a localized grid guide with data from current listings to up to 2 weeks into the future.
5. By clicking on any listing, Joe gets the following options:
   a. Read more about this show.
   b. Set this show to record on my DVR.
6. By choosing "Set this show to record on my DVR," Joe gets menu options to:
   a. Record this episode only.
   b. Record the series.
7. After choosing single or series episodes to record, Joe gets the following:
   c. Should this recording request be in conflict with other recordings already scheduled on your DVR, what would you like to do (in other embodiments, more sophisticated conflict management options, detailing the exact programs that conflict, may be provided):
      i. Record this program and do not record my oldest pre-existing conflicting request?
      ii. Do not record this program?

8. Joe gets confirmation of all of his above choices and hits <enter>. Confirmation may be, for example, by visual or audible indication, text message, telephone call, e-mail, instant messaging, and so on.
9. Joe's recording request is delivered to, and programmed into the home DVR within 5 minutes of sending.

Use Case M: "Two-Way" Setup to Record a Program from the Office

Video/DVR subscriber (Gordon) has three DVRs in his home. Gordon has broadband access to the Internet from his PC at work.

1. Gordon goes to the office and logs onto the appropriate web site.
2. Gordon logs in to his personal account.
3. From the website, Gordon clicks a button for TV listings.
4. From the TV listings page, he can see a localized grid guide with data from current listings to up to 2 weeks into the future.
5. By clicking on any listing, Gordon gets the following options:
   a. Read more about this show.
   b. Set this show to record on my DVR.
6. By choosing "Set this show to record on my DVR," Gordon gets a menu option to choose which DVR he would like to control:
   a. Set recording to occur on DVR 1.
   b. Set recording to occur on DVR 2.
   c. Set recording to occur on DVR 3.
   d. Set recording to occur on all DVRs in home.
7. After choosing which DVR(s) to program, Gordon gets the following menu choices related to the show he has chosen:
   a. Record this episode only.
   b. Record the series.
8. After choosing single or series episodes to record, Gordon gets the following:
   a. Your request has been submitted to your DVR and is scheduled to record.
   Or
   b. Your request is in conflict with another recording scheduled during that time period on the DVR you have chosen. What would you like to do?
      i. Do not record Show A.
      ii. Do not record Show B.
      iii. Do not record this request (Show C).
      iv. Submit request on another DVR in your home (interface will go through same steps (8a-8b) for each DVR chosen.
9. Gordon gets confirmation of all of his above choices and hits <enter>.
10. Gordon's recording request is delivered to, and programmed into the home DVR within 5 minutes of sending.

Use Case N: Replicate DVR Experience on Remote Web Site

Video/DVR subscriber (Sally) has one DVR in her home. Sally has broadband access to the Internet from her PC at work.

1. Sally goes to the office and logs onto the appropriate web site.
2. Sally logs in to her personal account.
3. From the website, Sally clicks a button for "Control My DVR."
4. Sally is presented with a menu that replicates her at-home STB/DVR Guide experience.
5. Sally is able to:
   a. Browse and search TV listings.
   b. Schedule recordings on her DVR (single episode, series).
   c. Review and modify scheduled recordings (including managing tuner conflicts).
   d. Review and manage saved recordings.
6. All of Sally's actions via the remote web site happen within 5 seconds of her request being made from the web interface.
7. All choices made by Sally receive on-screen confirmation, as they would in the at-home experience.

Use Case O: Simple "One-Way" Setup to Record a Program from Mobile Phone

Video/DVR subscriber (Lucy) has one DVR in her home. Lucy has a mobile phone with a Remote DVR Application.

1. Lucy goes through an initial setup process that synchronizes her mobile phone with her cable TV account, including identifying and tying her phone to her Customer Premises Equipment (DVR) from the cable provider.
2. Lucy hits a shortcut key on her phone to bring up a TV Listings interface.
3. (Lucy does not need to log in or further authenticate after her initial setup).
4. From the phone, Lucy clicks a button for TV listings.
5. From the TV listings screen, she can see a localized grid guide with data from current listings to up to (for example) 2 days into the future.
6. By clicking on any listing, Lucy gets the following options:
   a. Read more about this show.
   b. Set this show to record on my DVR.
7. By choosing "Set this show to record on my DVR," Lucy gets menu options to:
   a. Record this episode only.
   b. Record the series.
8. After choosing single or series episodes to record, Lucy gets the following:
   a. Should this recording request be in conflict with other recordings already scheduled on your DVR, what would you like to do:
      i. Record this program and do not record my oldest pre-existing conflicting request?
      ii. Do not record this program? (again, more sophisticated conflict resolution choices may be made available in other embodiments)
9. Lucy gets confirmation of all of his above choices and hits <enter>.
10. Lucy's recording request is delivered to, and programmed into the home DVR within minutes of sending.

Use Case P: "Two-Way" Setup to Record a Program from Mobile Phone

Video/DVR subscriber (Alex) has one DVR in his home. Alex has broadband access to the Internet from his PC at work.

1. Alex goes through an initial setup process that synchronizes his mobile phone with his cable TV account, including identifying and tying his phone to his Customer Premises Equipment (DVR) from the cable provider.
2. Alex hits a shortcut key on his phone to bring up a TV Listings interface.
3. (Alex does not need to log in or further authenticate after his initial setup).
4. From the phone, Alex clicks a button for TV listings.

5. From the TV listings screen, he can see a localized grid guide with data from current listings to up to 2 days into the future (for example).
6. By clicking on any listing, Alex gets the following options:
   a. Read more about this show.
   b. Set this show to record on my DVR.
7. By choosing "Set this show to record on my DVR," Alex gets menu options to:
   a. Record this episode only.
   b. Record the series.
8. After choosing single or series episodes to record, Alex gets the following:
   a. Your request has been submitted to your DVR and is scheduled to record.
      1. Or
   b. Your request is in conflict with another recording scheduled during that time period. What would you like to do?
      i. Do not record Show A
      ii. Do not record Show B.
      iii. Do not record this request (Show C).
9. Alex gets confirmation of all of his above choices and hits <enter>. Alex's recording request is delivered to, and programmed into the home DVR within 5 minutes of sending.

As noted, one or more embodiments of the invention provide conflict resolution when remotely programming a DVR. In some instances, a so-called "fire-and-forget" approach can be taken, where a user simply makes a request and receives no feedback, or an error message, when the request cannot be honored due to a conflict. However, in one or more embodiments, real-time connectivity to the DVR over the content network can be leveraged to provide real-time conflict resolution. In particular, real-time communication can be provided between (i) a device (e.g. cell phone, personal computer with a web browser) having an appropriate user interface and (ii) a DVR in the home, in order to determine if there are any scheduling conflicts between a program it is desired to record, and one or more programs that are already scheduled for recording. In general terms, the aforementioned device may be any consumer electronics device other than the DVR 158 and its associated television set and local (e.g., infrared) remote control.

The device may be, for example, on a network operated by a content service provider, a third party network, or the Internet, and it is possible to traverse into a content network, such as a cable television network. For example, as shown in FIG. 7, a device, such as a PC depicted in block 718 or a mobile device as in block 792, accesses application server tier 790, which may be located, for example, in a regional data center, and in turn communicates with division head end server 768, and then actually communicates in real time back and forth with the DVR 158 in the home.

Although aspects of the invention may be practiced in many different ways, in some instances, it may be particularly advantageous for implementation to be carried out by a multi-service provider having a customer relationship across different product lines, e.g. cellular telephone service, Internet connectivity (such as via cable modem), video service interfacing with the DVR, and so on. Such multi-service providers may be well-positioned to establish the real-time communication between the device and DVR, in order to effectuate conflict resolution.

As noted elsewhere herein, real time communication with the DVR is advantageous, in one or more embodiments, as the actual list of scheduled recordings, and not a persisted copy (which might not be up-to-date) is accessed. In some instances, the list of scheduled recordings can be retrieved even before trying to schedule a recording. In one or more embodiments, communication can be carried out with the DVR 158, obtaining a list of scheduled recordings, and such list can be compared, at the web application level (say, in block 790), to see if anything is scheduled in the time slot where it is desired to schedule the recording. A conflict detected by server tier 790 can be communicated to the customer, using the PC as at block 718, mobile device (e.g., cell phone) as at 792, and the like. For example, the user could be advised "you indicated that you wanted to watch 'News at 10' but that conflicts with 'Electronic Gadget Repair Show'—how do you want to solve this problem?" Since the consumer knows in real time what has happened—i.e., was recording successfully scheduled, was there a conflict, etc., the user will have a more satisfying use experience, since scheduling can be confirmed and conflicts can be checked for in real time.

The required communications between the device (e.g., wireless device, PC with web browser and so on), the server tier 790, the head end 768, and the DVR 158 can be carried out using the communications techniques described elsewhere herein, for example, the aforementioned SOAP web service protocol.

With reference back to FIG. 8, in some instances, in block 836, system 700 obtains a list of scheduled recordings, preferably directly from DVR 158, as discussed above. This list may display shows currently recorded and/or shows scheduled to be recorded, and, in one or more embodiments, can be obtained via a web service, as shown at block 838.

In block 840, the user is helped to find something he or she wishes to record, for example, by one or more of display of a channel grid, as at block 842; a browse display (that is, a list of all the programs for the next predetermined time period on a given channel), as at block 844; and a program search (for example, a text search for "football"), as at block 846. The program data can be obtained, for example, from the EPG data block 750 or preferably the database 760, as shown at block 848. In block 850, the user specifies which program he or she wishes to record. If there is no conflict, at block 852, system 700 issues instructions to cause the selected program to be recorded; for example, by using a web service that specifies the program identification discussed above, and the identity of the DVR (for example, its MAC address or other indicia), causing the desired program to be placed in the correct DVR's record queue. However, functionality in block 790 may detect a conflict; for example, a tuner conflict (another program scheduled to be recorded at the same time, or an overlapping time), and/or a storage conflict (not enough space left on the DVR's hard drive to record the show). The user may identify a show that it is desired to record, e.g., "Bass Fishing Today" at 9 PM on the "field sports channel." The corresponding block of time may typically be identified in a standard way, via a date/time stamp. Further, the program "Bass Fishing Today" itself has a unique program ID dictated by the feed from block 750, which may be stored in database 760.

In one or more embodiments, when the user initializes a session with the remote DVR application layer 790, layer 790 accesses the DVR 158 that the user wants to work with and retrieves its list of recordings scheduled for the future. That list may be retained, for example, as a session variable in the application. An application in tier 790 makes a calculation to determine the time block when "Bass Fishing Today" is on and determines if something is already scheduled to record at such time. Preferably, the list of currently scheduled recordings is refreshed right at this moment, so as to make sure that someone else (e.g., at home, using the remote) has not just scheduled a new recording that would conflict.

In summary, application server tier 790 connects to a web service to get the current list of scheduled recordings, and then compares time blocks, e.g., by taking the program ID for whatever is already scheduled, and performing a look up in database 760 (or, less desirably, in remote block 750) to determine, based on the program ID, what is already scheduled. If a conflict is detected between "Bass Fishing Today", and, say, "Great Hikes in the Adirondacks," the user can be presented with a screen describing the conflict and asking what action is desired. In one simple approach, two choices could be offered, namely, (i) cancel "Great Hikes in the Adirondacks" and record "Bass Fishing Today" or (ii) keep "Great Hikes in the Adirondacks" and do not record "Bass Fishing Today." The choices may be offered to the user of the device in a presentation layer. Thus, one or more embodiments employ a real time client server model that takes effect with two-way communication over the network, allowing the user to get real-time feedback about conflicts—subsequent messages carry on a dialog with DVR 158 to resolve the conflict in a manner the user wishes, as opposed to an automated process that the user cannot control.

In one or more embodiments, data is represented in the DVR 158 by a time stamp and program ID based on data in blocks 750 and 760. The time stamp may be responsive to user rules, since the user of DVR 158 can set parameters such as an enlarged window before and/or after a program (e.g., in case a football game goes into overtime). The start time, end time, and program ID may be obtained by server tier 790 from DVR 158 and the ID may be used in a look-up in the data available within block 760 (or block 750 if cached data 760 was not available). The time for the requested program is checked by tier 790, which determines if there is a conflict with material already scheduled for recording, in which case the user is advised of the conflict. Other refinements may be offered; for example, where programs do not conflict over their entire duration, but only overlap to some extent, a "clipping" option may be offered. One non-limiting instance of this would be where the buffer at the end of the football game conflicts with another show—one could choose to keep the football game, but clip off the buffer to record additional material broadcast after the nominal time slot for the football game.

Note that some DVRs 158 may have more than one tuner, so that it may be possible to record more than one program being broadcast at the same time, as each tuner may tune to a different channel. When one or more extra tuners are present, this can be taken into account in determining whether a conflict exists.

Figure 12:
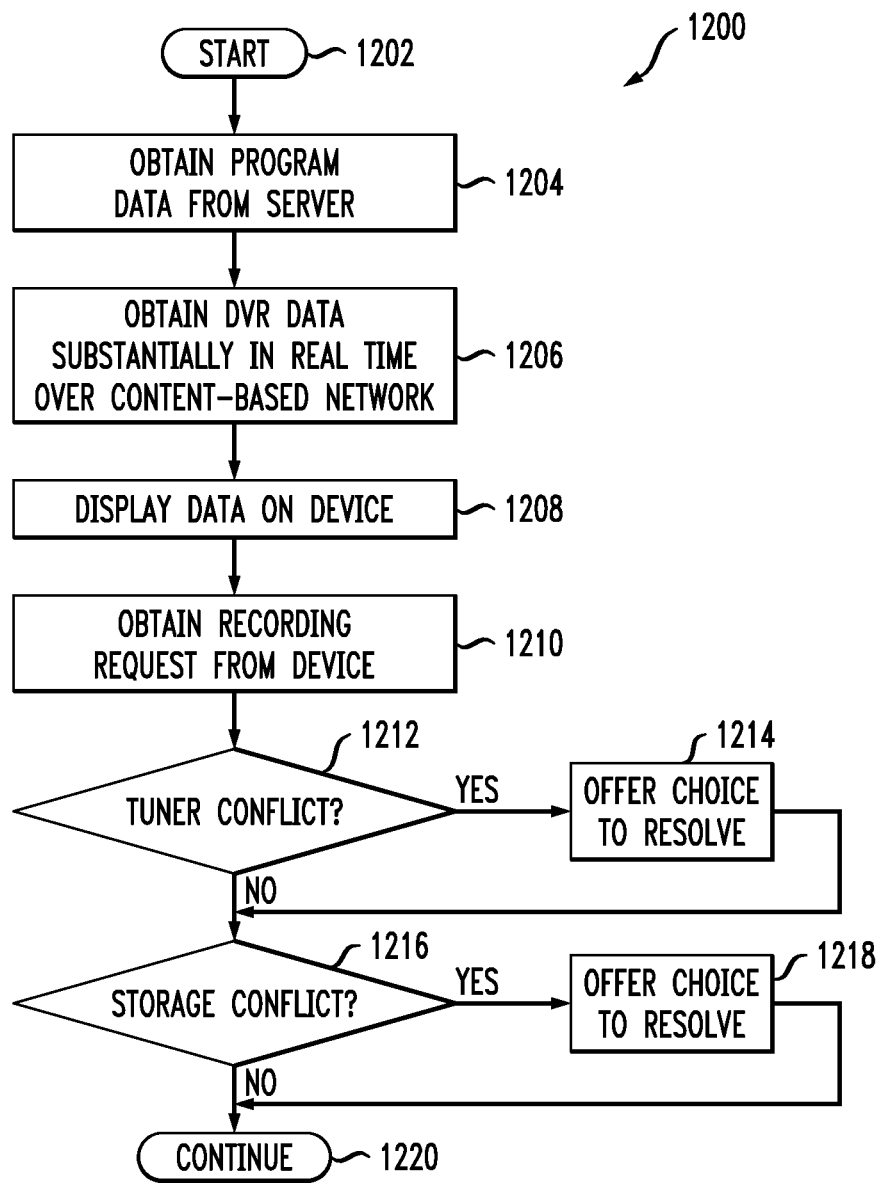
FIG. 12 is a flow chart of an exemplary method of resolving conflicts in remote control of a digital video recorder, according to a still further aspect of the invention.

FIG. 12 presents a flow chart 1200 of exemplary steps in a method for resolving conflicts in connection with controlling at least one digital video recorder interconnected with a content-based network. Note that while specific elements in FIGS. 7 and/or 9 are identified as performing various steps, this is by way of example only, and not limitation; other elements may perform such steps in other embodiments. The method can include the step of querying at least one server to obtain program data from the server (for example, electronic program guide data from block 760 or 750) and DVR data (e.g., listing of any programs currently scheduled for recording on the digital video recorder) from the digital video recorder 158. A further step can include receiving the program data from the server and the DVR data from the digital video recorder. This functionality is shown in steps 1204, 1206. The DVR data can be obtained from the digital video recorder 158 substantially in real time over the content network (including block 768), as stated in block 1206.

Further, the method can include displaying the program data and/or the DVR data on a separate device (for example, the PC in block 718 or mobile device in block 792, such as a remote wireless device (cellular telephone handset, PDA, and the like)) in communication with the content-based network, as at block 1208. As shown in FIG. 7, the device (e.g., Internet-connected personal computer 718 or mobile device 792) is in communication with the content network through Internet 762 and server tier 790. FIG. 9 shows additional details of exemplary connectivity of mobile devices 704, 706, 708. The method can still further include obtaining, at the separate device, a request to record a given program on the at least one digital video recorder 158, as shown at block 1210. In general terms, the "separate" device refers to a device other than the DVR 158 and its associated television set and local (e.g., infrared) remote control. The method can further include detecting a conflict associated with the request to record the given program and resolving the conflict based at least on a user input received at the separate device. Conflicts can include tuner and/or storage conflicts, each with choices which may be offered to the user for resolution, as shown at blocks 1212, 1214, 1216, and 1218. Processing continues at block 1220.

As noted elsewhere herein, "real time" refers to a case where a desired action happens within 30 seconds, and preferably within 5 seconds, from the input intended to cause the action—for example, the elapsed time between the querying of the server, and the displaying of the DVR data on the separate device.

Further exemplary details will now be provided with regard to step 1212. Such detecting step can include comparing a time slot of the given program that it is desired to record with any time slots associated with the listing of any programs currently scheduled for recording, in order to determine if a conflict exists. As noted, the program data can include electronic program guide data from blocks 760 or 750, and the listing of currently scheduled programs can include a program identifier for each of the currently scheduled programs. Step 1212 can then include determining the time slots for the currently scheduled programs by accessing the electronic program guide data, based on the program identifiers, to obtain the time slots. In many instances, the listing of currently scheduled programs further includes at least one time stamp for each of the currently scheduled programs (typically two stamps, a start time and an end time), and the time slots for the currently scheduled programs are also determined based on the time stamps. The time slot of the given program to be recorded can also be determined by accessing the electronic program guide data.

When a tuner conflict is detected in block 1212, the user of the separate device can be offered an appropriate choice to resolve the conflict, as shown at block 1214—for example, a choice to select either the given program or the conflicting one(s) of the currently scheduled programs for recording. In a case where the given program and the conflicting one of the currently scheduled programs partially overlap, resolving step 1214 may further include offering the user of the separate device a choice to "clip" the given program or the conflicting one of the currently scheduled programs. In a case where at least one additional digital video recorder is available to the user, resolving step 1214 may further include offering the user a choice to record the given program or the conflicting one of the currently scheduled programs on the additional digital video recorder. As noted, if a given DVR 158 has multiple tuners, this can be taken into account in determining whether a conflict exists.

In some instances, the aforementioned DVR data may include the remaining recording capacity of the digital video recorder. Step 1216 includes comparing the recording duration for the given program now desired to be scheduled for recording with the remaining recording capacity of the digital video recorder, to determine if a storage conflict exists. If this is the case, resolving step 1218 includes offering the user of the separate device a choice to select either not recording the given program or deleting at least some material currently stored on the digital video recorder. Further choices and messages can be provided where there is only sufficient space remaining to record some, but not all, programs currently scheduled for recording, plus the given program for which it is now desired to schedule recording.

For both blocks 1212 and 1216, if no conflict is detected, processing simply flows to block 1216 in the case of block 1212, or block 1220 in the case of block 1216.

A system for resolving conflicts in connection with controlling at least one digital video recorder 158 with another (separate) device, such as the PC in block 718 or remote (e.g., wireless) device in block 792, can include a content-based network, including block 768, coupled to the at least one digital video recorder 158, and a DVR control application module, such as server tier 790, coupled to the content network and the device, and configured to obtain program data, obtain DVR data from the digital video recorder (substantially in real time over the content network), facilitate display of the program data and/or the DVR data on the device, and obtain, from the device, a request to record a given program on the digital video recorder. The DVR control application module can also be configured to detect a conflict associated with the request to record the given program, and to resolve the conflict based at least on a user input received from the device.

In another aspect, a method is provided for a content service provider to offer a consumer a service of resolving conflicts in connection with controlling at least one digital video recorder operated by the content service provider. With reference to blocks 1204 and 1206, the method includes the steps of facilitating querying at least one server from a device of the consumer to obtain program data from the server and DVR data from the digital video recorder. The at least one server is under control of the content service provider. With reference to step 1208, in the method of providing the service, the content service provider transmits the program data from the server and the DVR data from the digital video recorder in a format for display of the program data and/or the DVR data on the device. The DVR data is obtained from the digital video recorder substantially in real time over the content-based network.

In block 1210, the content service provider obtains, from the separate device, a request to record a given program on the at least one digital video recorder. As discussed with regard to blocks 1212 and 1216, the service provider detects a conflict associated with the request to record the given program. As per blocks 1214 and 1218, the conflict is resolved by the service provider, based at least on a user input received from the separate device (e.g., a wireless device operating over a wireless network operated by the content service provider or its partner, a personal computer operating over an Internet connection provided by the content service provider or its partner, and so on). The content service provider can be, for example, a cable service provider, a direct broadcast satellite service provider, or a telephone service provider offering video content services.

FIGS. 13-29 depict aspects of a unified messaging protocol which may be useful in connection with communicating with DVRs 158. The unified messaging protocol addresses the message flow, including the content for requests, return codes, and so on, as well as how to format the messages into packets of information. In particular, FIGS. 13 and 14 depict, respectively, unified messaging headers for a request and a response. FIGS. 15-18 depict a request header, event attributes, recording attributes, and result attributes for remote DVR management. To simplify the message structure, the DVR messages build on some base complex types. FIGS. 19-24 are also directed to remote DVR management, and depict scheduling a DVR recording request, the response thereto, an un-schedule request and its response, and a show list request and response.

The following are examples of core messages that may be used by a navigation application:

Message Domain: 0x01

The following blocks of Message Types can be reserved for different groups of functionality:

| | |
|---|---|
| General Messages: | 0x01-0x3F |
| Settings Message: | 0x40-0x4F |
| OnDemand: | 0x50-0x5F |
| CallerID: | 0x60-0x6F |
| TMC: | 0x70-0x7F |
| Reserved: | 0x80-0xFF |

Appropriate general messaging can be developed to address, for example, profile updates, set top box (DVR) re-boots, STB non-volatile random access memory (NVRAM), DVR format, clear catalogs, and the like.

Figure 11:
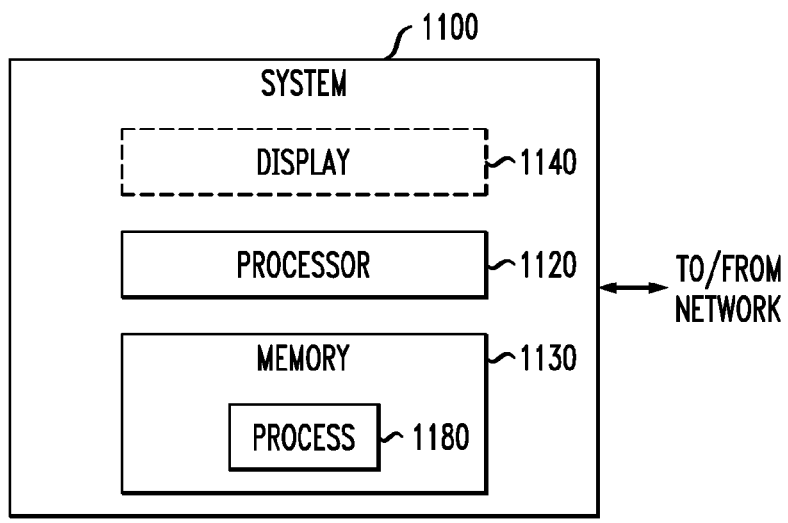
FIG. 11 is a block diagram of a computer system useful in connection with one or more aspects of the invention

The invention can employ hardware and/or software aspects. Software includes but is not limited to firmware, resident software, microcode, etc. An exemplary embodiment of an inventive apparatus can include a memory and at least one processor coupled to the memory. The processor can be operative to facilitate performance of one or more of the method steps described herein. In another aspect, the apparatus can comprise means for performing the various method steps. The means can include one or more hardware modules, one or more software modules, or a mixture of one or more software modules and one or more hardware modules (appropriate interconnections via bus, network, and the like can also be included). One or more method steps of the present invention can be implemented in the form of an article of manufacture comprising a machine readable medium that contains one or more programs that when executed implement such step or steps. FIG. 11 is a block diagram of a system 1100 that can implement part or all of one or more aspects or processes of the present invention, processor 1120 of which is representative of processors (such as those in head end 105 or the various servers in the blocks/modules/layers) depicted in the other figures. In one or more embodiments, inventive steps are carried out carried out by one or more of the processors in conjunction with one or more interconnecting network(s). As shown in FIG. 11, memory 1130 configures the processor 1120 to implement one or more aspects of the methods, steps, and functions disclosed herein (collectively, shown as process 1180 in FIG. 11). The memory 1130 could be distributed or local and the processor 1120 could be distributed or singular. The memory 1130 could be implemented as an electrical, magnetic or optical memory, or any combination of these or other types of storage devices. It should be noted that if distributed processors are employed, each distributed processor that makes up processor 1120 generally contains its own addressable memory space. It should also be noted that some or all of computer system 1100 can be incorporated into an application-specific or general-use integrated circuit. For example, one or more method steps could be implemented in hardware in an ASIC rather than using firmware. Display 1140 is representative of a variety of possible input/output devices.

System and Article of Manufacture Details

As is known in the art, part or all of one or more aspects of the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, EEPROMs, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. Such methods, steps, and functions can be carried out, e.g., by processing capability on individual elements in the other figures, or by any combination thereof. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the present invention can make use of computer technology with appropriate instructions to implement method steps described herein.

Accordingly, it will be appreciated that one or more embodiments of the present invention can include a computer program comprising computer program code means adapted to perform one or all of the steps of any methods or claims set forth herein when such program is run on a computer, and that such program may be embodied on a computer readable medium. Further, one or more embodiments of the present invention can include a computer comprising code adapted to cause the computer to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for resolving conflicts in connection with controlling at least one digital video recorder interconnected with a content-based network, said method comprising the steps of:

querying at least one server to obtain program data from said server and DVR data from said digital video recorder;

receiving said program data from said server and said DVR data from said digital video recorder, said program data comprising electronic program guide data, and said DVR data being obtained from said digital video recorder substantially in real time over said content-based network and comprising a listing of any programs currently scheduled for recording on said digital video recorder, said listing comprising at least a unique program identifier for each of said currently scheduled programs;

displaying said program data and/or said DVR data on a device, remote from said digital video recorder and said server, in communication with said content-based network;

receiving, at said device, a request to record a given program on said at least one digital video recorder;

determining respective time slots of each of any programs currently scheduled for recording on said digital video recorder at least in part by accessing said electronic program guide data with said unique program identifiers;

detecting a conflict associated with said request to record said given program at least in part by comparing a time slot of said given program with any time slots determined for said currently scheduled programs;

offering on said device one or more options to resolve said conflict; and resolving said conflict based at least on a user input received at said device;

wherein said resolving step comprises offering a user of said device a choice to select one of said given program and a conflicting one of said currently scheduled programs for recording;

wherein said given program and said conflicting one of said currently scheduled programs partially overlap, and wherein said resolving step further comprises offering a user of said device a choice to clip one of said given program and said conflicting one of said currently scheduled programs.

* * * * *